United States Patent
Zhu et al.

(10) Patent No.: US 11,672,242 B2
(45) Date of Patent: Jun. 13, 2023

(54) SYSTEM FOR RECORDING AND REPLAYING JIGGING SEQUENCES

(71) Applicants: Ray Guosheng Zhu, Fremont, CA (US); Kevin P. Zhu, Fremont, CA (US)

(72) Inventors: Ray Guosheng Zhu, Fremont, CA (US); Kevin P. Zhu, Fremont, CA (US)

(*) Notice: Subject to any disclaimer, the term of this patent is extended or adjusted under 35 U.S.C. 154(b) by 176 days.

(21) Appl. No.: 17/322,868

(22) Filed: May 17, 2021

(65) Prior Publication Data
US 2021/0352883 A1    Nov. 18, 2021

Related U.S. Application Data

(60) Provisional application No. 62/705,218, filed on Jun. 16, 2020, provisional application No. 62/704,588, filed on May 17, 2020.

(51) Int. Cl.
| | |
|---|---|
| *A01K 97/00* | (2006.01) |
| *A01K 97/12* | (2006.01) |
| *G06F 3/041* | (2006.01) |
| *G06F 3/0338* | (2013.01) |
| *A01K 97/10* | (2006.01) |
| *G06F 3/01* | (2006.01) |

(52) U.S. Cl.
CPC ............ *A01K 97/125* (2013.01); *A01K 97/10* (2013.01); *G06F 3/013* (2013.01); *G06F 3/015* (2013.01); *G06F 3/0338* (2013.01); *G06F 3/041* (2013.01)

(58) Field of Classification Search
CPC ........ A01K 97/10; A01K 97/11; A01K 97/12; A01K 97/125; A01K 91/06; A01K 91/02
See application file for complete search history.

(56) References Cited

U.S. PATENT DOCUMENTS

| | | |
|---|---|---|
| 4,397,113 A | 8/1983 | Pinson |
| 4,603,499 A | 8/1986 | Simborski |
| 4,680,885 A | 7/1987 | Lindell et al. |
| (Continued) | | |

FOREIGN PATENT DOCUMENTS

| | | |
|---|---|---|
| KR | 20120048990 A1 | 12/2016 |
| KR | 101816440 B1 | 1/2018 |
| (Continued) | | |

*Primary Examiner* — Joshua J Michener
*Assistant Examiner* — Henry Hooper Mudd
(74) *Attorney, Agent, or Firm* — Adibi IP Group, PC; Amir V. Adibi; Andrew C. Palmer

(57) ABSTRACT

A system comprises a rod holder, an input device, a driving device, and a controller. The rod holder holds one or more fishing rods. The driving device is coupled to drive the rod holder. The controller controls the driving device to move the rod holder based on stored rod movement information, based on a random generated movement sequence, or based on real time user input. In operation, the input device receives rod movement information that indicates at least one characteristic of rod movement, including position, timing, direction, angle, or speed. During recording of a jigging sequence, the controller stores rod movement information as stored rod movement information. During replaying of a jigging sequence, the controller controls the rod holder based on the stored rod movement information. The sequence is repeated until the user stops the replaying. The system is optionally controlled to perform a random jigging sequence.

20 Claims, 26 Drawing Sheets

(56) References Cited

U.S. PATENT DOCUMENTS

| | | |
|---|---|---|
| 4,932,151 A | 6/1990 | Cicha |
| 4,951,411 A | 8/1990 | Ecker |
| 5,119,580 A | 6/1992 | Schulte et al. |
| 5,570,534 A | 11/1996 | Ford |
| 6,401,380 B1 | 6/2002 | McGonigal, Jr. |
| 6,415,543 B2 | 7/2002 | Keller |
| 6,634,134 B1 | 10/2003 | Nyquist |
| 8,136,289 B2 | 3/2012 | Modglin |
| 8,453,371 B1 | 6/2013 | Sullivan |
| 9,179,657 B1 * | 11/2015 | Winter ............... A01K 97/10 91/65 |
| 2001/0049899 A1 | 12/2001 | Keller |
| 2006/0032105 A1 | 2/2006 | Modglin |
| 2006/0248778 A1 | 11/2006 | Ward et al. |
| 2007/0011937 A1 | 1/2007 | Roh et al. |
| 2007/0266615 A1 | 11/2007 | Norman |
| 2012/0102813 A1 | 5/2012 | Rosemann |
| 2012/0266516 A1 | 10/2012 | White |
| 2014/0358483 A1 | 12/2014 | da Rosa |
| 2015/0223440 A1 * | 8/2015 | Schmaus ............ A01K 97/10 97/10 |
| 2016/0324134 A1 | 11/2016 | Pikarski |
| 2018/0338486 A1 | 11/2018 | Blackadar et al. |

FOREIGN PATENT DOCUMENTS

| | | |
|---|---|---|
| KR | 101903902 B1 | 10/2018 |
| KR | 102127086 B1 | 6/2020 |
| SU | 1598942 A1 | 5/1988 |

\* cited by examiner

EXAMPLE DATA STRUCTURE IN MEMORY

FIG. 17 — STORE ROD MOVEMENT INFORMATION

STORE ROD MOVEMENT INFORMATION

CONTROL ROD HOLDER BASED ON STORED
ROD MOVEMENT INFORMATION

PROVIDING A JIGGING SEQUENCE MARKETPLACE

SYSTEM FOR RECORDING AND REPLAYING JIGGING SEQUENCES

CROSS REFERENCE TO RELATED APPLICATIONS

This application claims the benefit under 35 U.S.C. § 119 from U.S. Provisional Patent Application Ser. No. 62/704,588, entitled "Intelligent Fishing Rod Holder Teachable By Fisherman," filed on May 17, 2020. This application also claims the benefit under 35 U.S.C. § 119 from U.S. Provisional Patent Application Ser. No. 62/705,218, entitled "Intelligent Fishing Rod Holder Teachable By Fisherman," filed on Jun. 16, 2020. The entire subject matter of the aforementioned patent documents is incorporated herein by reference.

TECHNICAL FIELD

The present invention relates generally to fishing equipment, and more specifically, to fishing rod holder systems.

BACKGROUND INFORMATION

Jigging and trolling in fishing requires movement of the fishing rod to allow the lure to imitate a live bait fish. A fisherman typically makes different presentations for different species of fish and also changes presentations for the same species to attract fish. Often, jigging needs to produce a sudden upward jerking motion. Such sudden upward jerking motions allow the lure to free fall in the water. This free fall of the lure imitates a wounded baitfish. Typically, fishermen tend to present different combinations of jigging motions depending on the type of fish they are pursuing.

SUMMARY

A jigging system comprises a rod holder, an input device, a driving device, and a controller. The rod holder holds one or more fishing rods. The driving device is coupled to drive the rod holder. The controller controls the driving device to move the rod holder based on stored rod movement information, based on a random generated movement sequence, or based on real-time user input. In operation, the input device receives rod movement information that indicates at least one characteristic of rod movement, including position, timing, direction, angle, or speed. During recording of a jigging sequence, the controller stores rod movement information as stored rod movement information. During replaying of a jigging sequence, the controller controls the rod holder based on the stored rod movement information. The jigging sequence is repeated until the user stops the replaying. The jigging system is optionally controlled to perform a random jigging sequence.

In accordance with one embodiment, a system for moving a fishing rod repetitively and automatically, following one or more sequences of movements or presentations taught by a fisherman, is provided. The system includes a moving rod holder that can be used with conventional fishing rods and reels. The device comprises a rod receptacle, a drive mechanism, a computer or microprocessor driven controller with user interface and memory, and a housing. The device drives the movements (including, but not limited to, timing, direction, angle, speed) of the fishing rod.

A fisherman can use a control dial on the device to move the holder up or down, and fast or slow, synchronously with the movement of the dial. For example, a quick turn of a radio dial clockwise moves the holder up quickly, and a slow turn clockwise moves the holder up slowly. Similarly, a quick turn of the radio dial counterclockwise moves the holder down quickly, and a slow turn counterclockwise moves the holder down slowly. By pressing a button, a fisherman can start and stop saving or recording the data for a sequence of movements into memory and then let the device recreate or replay the saved sequence of movements repetitively and automatically until a stop button is pressed. There can be multiple saved sequences, and the processor can also create random movements.

A fisherman can let the device replay a sequence or a group of sequences repetitively. The device with sensors detecting a fish strike can set the hook, sound alarm, and play with the fish. The computer or microprocessor driven controller can perform functions common to all computers, including displaying data on a screen, taking input via a touch screen, accepting voice commands, communicating wirelessly, sharing data and commands with other devices, upgrading firmware, as well as uploading and downloading sequences. For example, when the device detects a fish strike, it can notify an electric fishing reel to reel in, The device can change the sequence of jigging based on the findings of a connected fish finder, and control of the device can be achieved by a remote mobile device.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
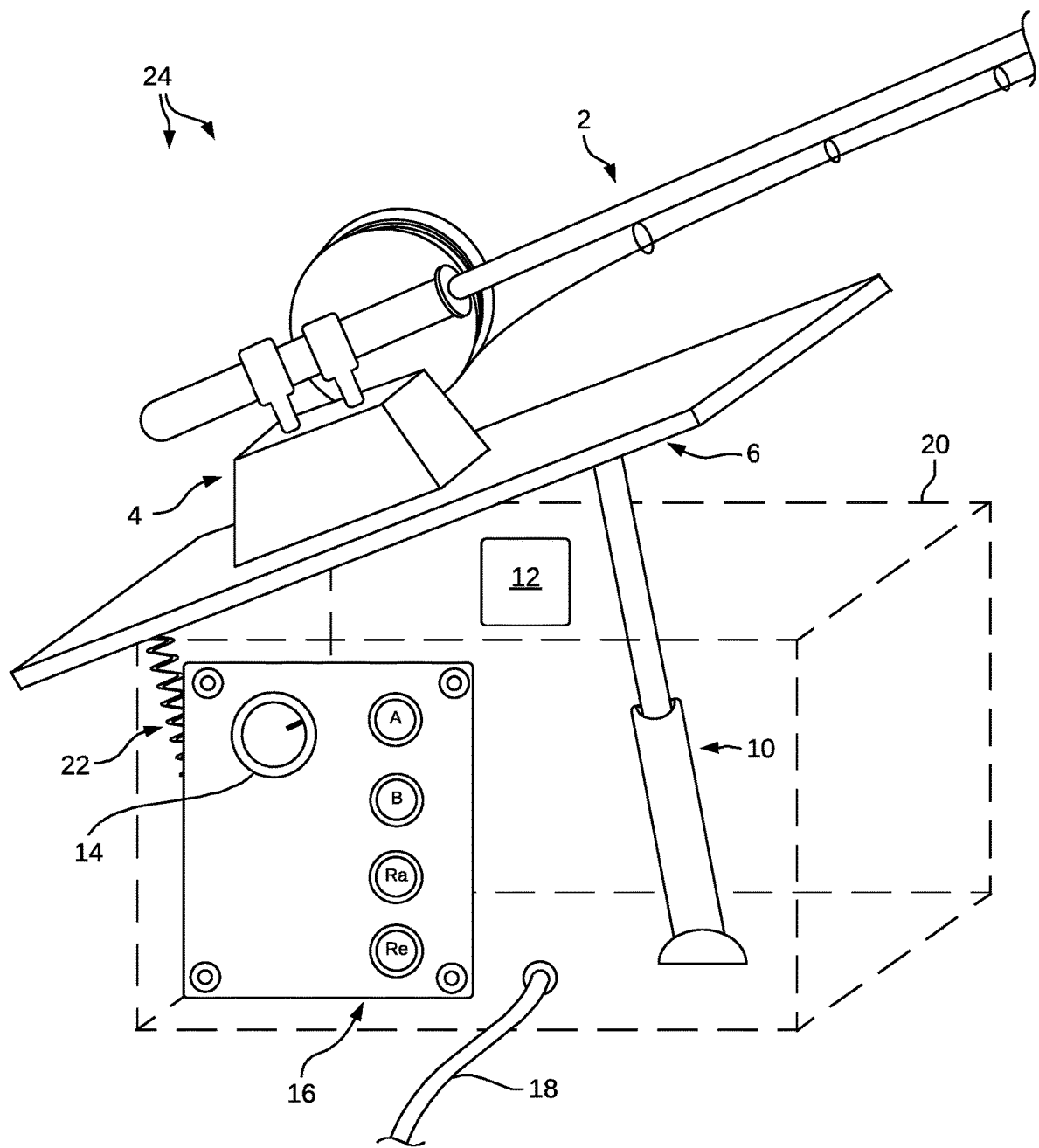
FIG. 1 is a diagram of a perspective view of a rod holder system 24 in accordance with one embodiment.

FIG. 1 is a diagram of a perspective view of a rod holder system 24 in accordance with one embodiment. System 24 comprises a rod holder 4, a driving device 10, a controller 12, an input device 14, a user interface 16, a power supply 18, and a housing 20. A fishing rod 2 is retained by rod holder 4. The rod holder 4 is coupled to a drive plate 6. In this example, the drive plate 6 is coupled to housing 20 via a hinge (not shown). In another example, drive plate 6 is coupled to housing 20 via a torsion spring (See FIG. 11). It is appreciated that the drive plate 6 is mountable in any suitable fashion to housing 20 such that the drive plate 6 is movable in accordance with techniques described herein. In other embodiments, the drive plate 6 is attached via pivot support that provides rotation about more than one axis. In one example, the drive plate 6 is rotatable about two axes, three axes, or six axes. In the example shown in FIG. 1, an extension spring 22 is coupled to the drive plate 6 and the housing 20 to assist the upward movement of the rod 2.

The driving device 10 is coupled to an interior surface of housing 20 and coupled to the drive plate 6. In this example, the driving device 10 comprises a motor which drives a linear servo. The driving device 10 is powered via power supply 18 and is coupled to controller 12. In another embodiment, driving device 10 comprises a rotary motor, a first arm, a second arm, and a pin (See FIG. 2). In yet another embodiment, driving device 10 comprises a motor and at least one extension arm coupled to at least one wheel (See FIG. 3).

A controller 12 is disposed within housing 20. In this example, controller 12 comprises a processor, a memory, and a hardware interface. Controller 12 is powered via power supply 18. In one example, the power supply 18 is Direct Current (DC) power. In another example, the power supply 18 is supplied by a portable battery. Controller 12 is coupled to the input device 14 and is coupled to the user interface 16.

Input device 14 is used to control rod movement. In the example shown in FIG. 1, input device 14 is shown as a dial disposed on the exterior of housing 20.

The user interface 16 includes various controls (e.g., buttons, dials, switches, scales) that may be used in conjunction with the input device 14. For example, the user interface 16 of FIG. 1 includes record/replay buttons (e.g. "A" and "B"), a random button ("Ra"), and a reset button ("Re"). In another embodiment, user interface 16 includes other buttons such as a power (on/off) button. In yet another embodiment, the user interface 16 is a digital touch screen. In yet another embodiment, the input device 14 is separate from and external to the user interface 16.

The input device 14 is used by a user to control the upward and downward movement of rod 2. In another embodiment, input device 14 is used by a user to control movement of rod 2 in other directions. In the embodiment shown in FIG. 1, input device 14 is a potentiometer. A potentiometer is commonly used in traditional radio volume control, linear or rotational. A rotational potentiometer can be turned clockwise or counterclockwise. Different rotational angles of the potentiometer 14 send different readings (a value ranging from 1 to 1023, for example) to the processor of controller 12. In other words, the processor of controller 12 receives angular position information based on the rotational angle of the input device (dial) 14. The processor of controller 12 reads the dial 14 and maps it to the next position (or target position) the linear servo (driving device)10 is to move to. After reading the dial 14 position, the processor of controller 12 sends a signal to the servo 10 to execute the move. In response, the servo 10 extends or retracts to the position instructed by the processor. As the user turns the dial 14 to the next angle, the processor again maps the new dial reading to the next servo position, sends a signal to the servo 10 to move, and so on. Processor of controller 12 executes the reading and sending of instructions to the linear servo 10 in a short time interval, usually in microseconds. As a result, any movement of the dial 14 will move the servo 10 almost concurrently, or synchronously.

Accordingly, turning of the dial 14 will drive the linear servo 10 to extend or retract. When the linear servo 10 extends, the drive plate 6 is moved up thereby moving the rod holder 4 up. When the linear servo 10 retracts, the drive plate 6 is moved down thereby moving the rod holder 4 down. The rod 2 is attached to the rod holder 4 and is moved up and down synchronously with the dial 14.

When the system 24 is not recording or replaying, the system 24 is in a "free" state. In the free state, a quick turn of "move/teach" dial 14 clockwise moves the holder 4 up quickly, and a slow turn clockwise moves the holder 4 up slowly. Similarly, a quick turn of the dial 14 counterclockwise moves the holder 4 down quickly, a slow turn counterclockwise moves the holder 4 down slowly.

A user can teach the driving device 10 a sequence of movements by long pressing (pressing and holding down for over a second, for example) button A (or B). Such a long press commands the processor to start recording the positions to memory. Upon detecting the long press, system 24 enters "recording A" state, that is, recording a presentation in memory that can be replayed later by pressing button A. This is also referred to as "teaching button A the moves" or "button A starting to learn the moves". The moves that make up the presentation or a sequence of positions the fisherman made by turning the "move/teach" dial 14 are saved or recorded into the memory area reserved for button A.

The recording is done by taking a series of dial readings in a predefined time interval. For example, if the interval is 50 milliseconds, the device will save the readings of the dial every 50 milliseconds. In 1,000 milliseconds, or 1 second, it will record 20 readings into memory as the user moves the dial. Even if the dial is not moved at all, the readings will still be saved at each interval, as these pauses are interpreted as an intended pause by the user.

A second press of button A will stop the recording and the device will enter replay A state. In the replay A state, the system 24 begins to recreate the moves by retrieving the first reading saved for button A, map the reading to servo position, execute the move, and wait for the same time interval used during recording. Next, the device reads the next reading, maps the reading to servo position, and executes the move, then waits for the predefined interval. This loop is repeated until the end of the recording is reached. After reaching the end of the recording, the system 24 returns to the first saved reading again to replay the presentation again until the system 24 is interrupted by a user action, such as via another button press. As a result, the system 24 automatically and repetitively replays stored jigging sequences.

The recorded presentation for a button is persistent in memory, even after the power is turned off and on. The recorded presentation can be replayed on the next fishing trip with a short press of the same button. Starting a new recording by long pressing a button will overwrite the previously recorded presentation for the button. In another embodiment, there can be multiple saved sequences. Button B is another programmable button, like button A, and is used to record a different sequence of movements. Other embodiments include more than two buttons, such as buttons C, D, etc. A fisherman selectively controls the system 24 to replay a sequence or a group of sequences repetitively.

In another embodiment, if a button "Random" (Ra) is short pressed, the system 24 begins "Random Play Regular", and if the button "Random" (Ra) is long pressed, the device starts "Random Play Fast". In either case, the controller 12 uses a randomly generated position as the next target position and then drives the servo or motor to the target. "Random Play Regular" creates smoother moves towards the target by using pauses along the way to the target. Random Play Fast creates sudden moves directly, toward the target with fewer or no pause along the way, but a longer pause is added once the target is reached. A sudden jerking motion can attract certain species of fish, particularly on the upward movement.

During Random Play, the move/teach dial reading is used to control the range of random movement. For example, in the "Free" state, rotating the Move/Teach dial from one extreme to the other would move the lure up and down by two (2) meters. The placement of the dial in the middle of its range would limit the Random Play range to 1 meter of lure movement up and down, and the placement of the dial at ¼ of its range would limit the Random Play range to 0.5 meters of lure movement up and down, and so on. This range control is useful for targeting certain species of fish. In another embodiment, there are separate dials to control the range and speed of random movements.

Figure 23:
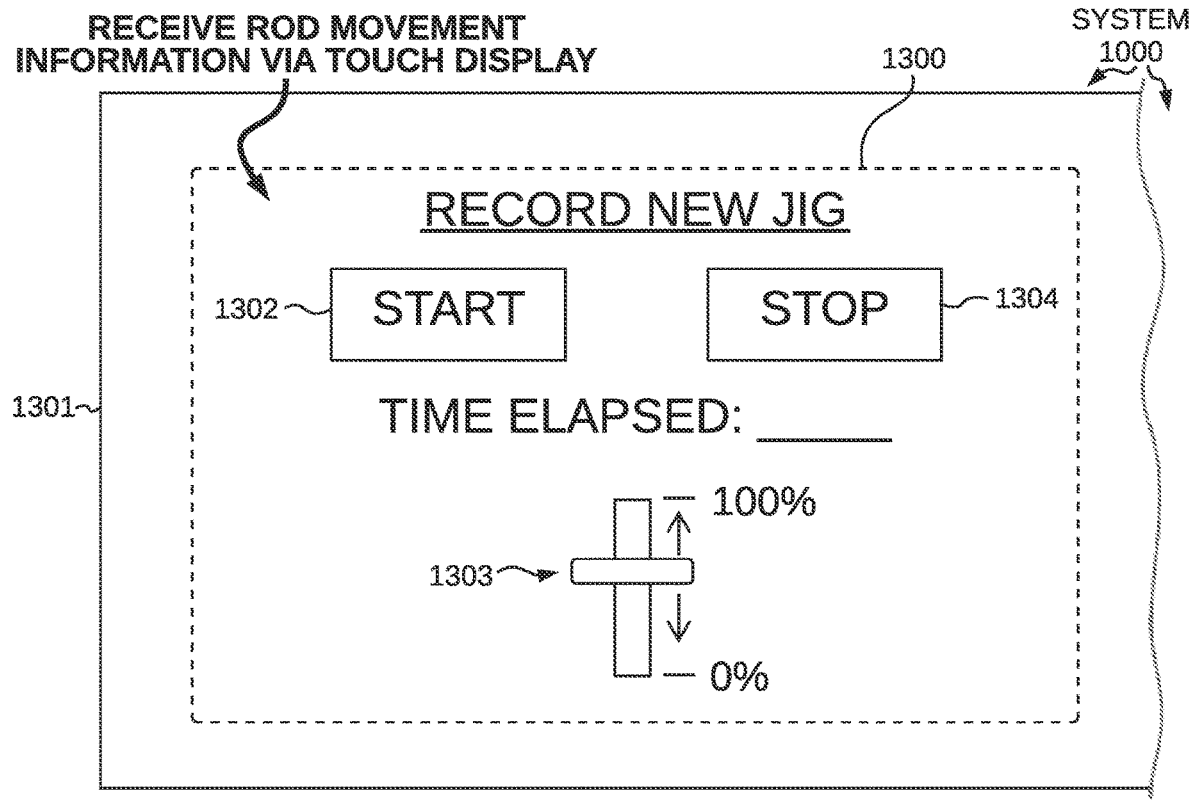
FIG. 23 is a diagram showing another embodiment of a user interface 1300 of the system 1000.
Figure 24:
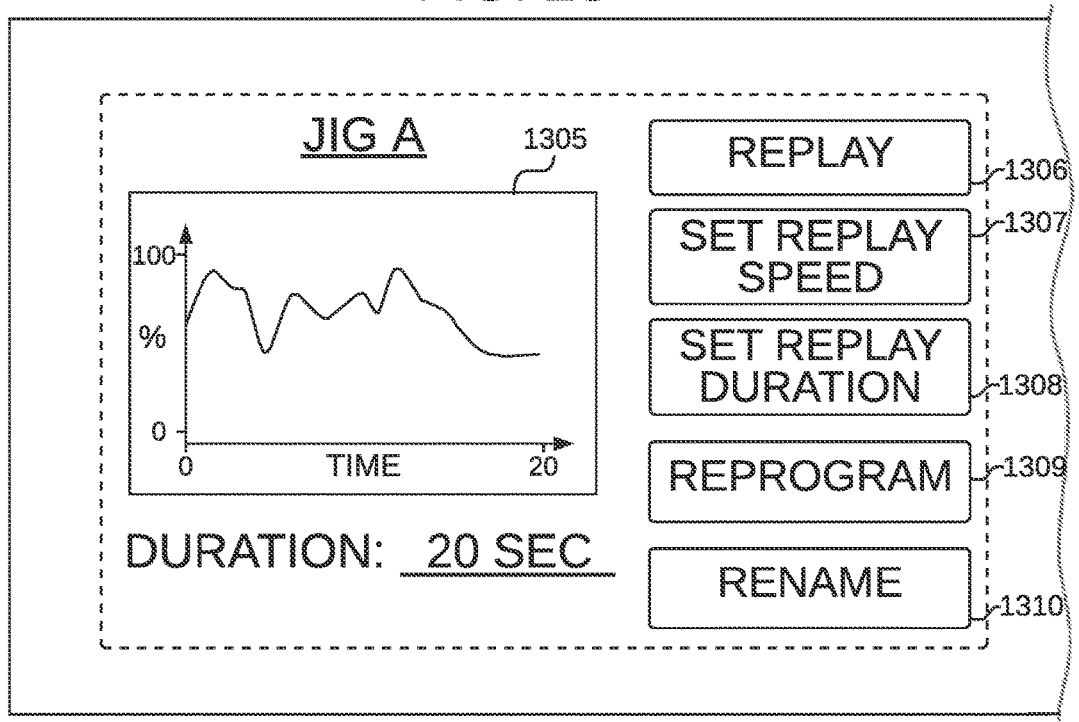
FIG. 24 is a diagram showing another screen of the user interface 1300.
Figure 25:
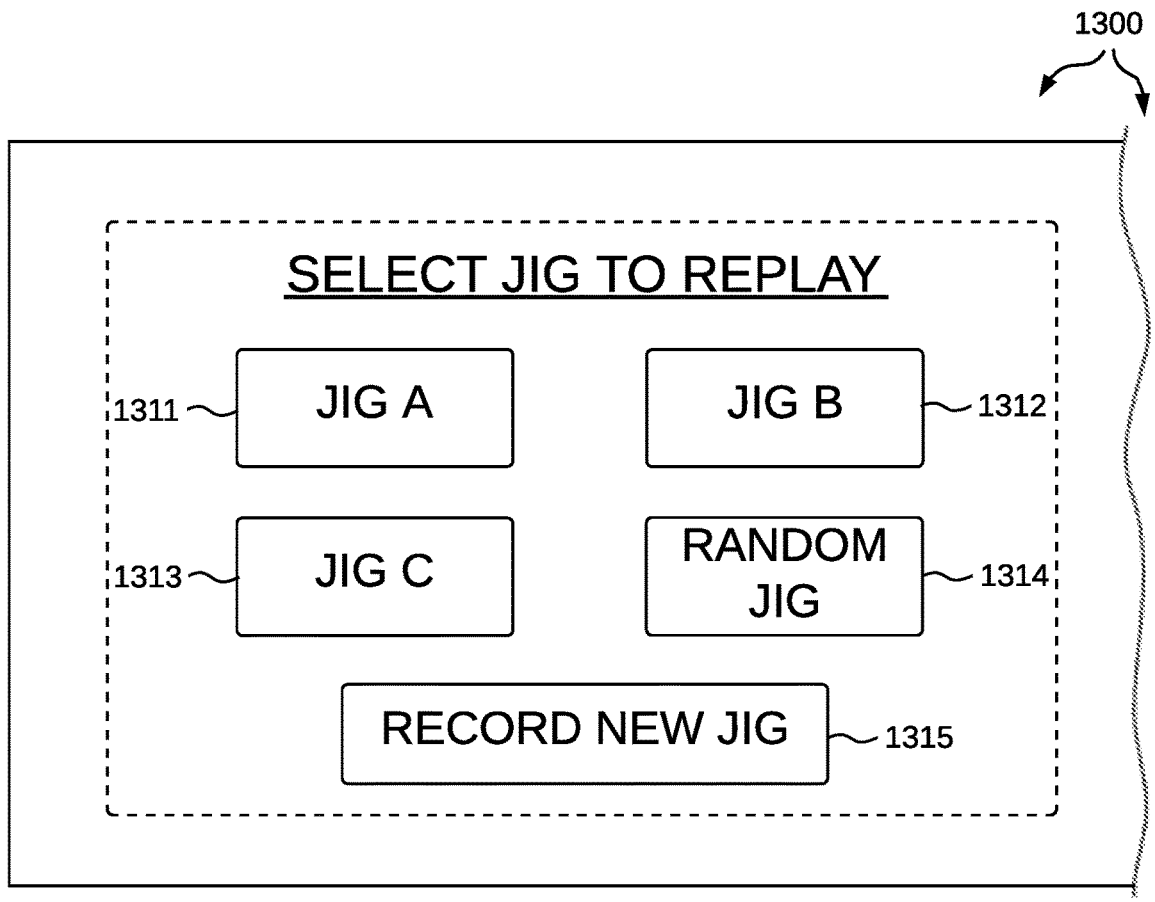
FIG. 25 is a diagram showing another screen of the user interface 1300.

In another embodiment, a device with sensors detecting a fish strike can set the hook, sound an alarm, and play with the fish. For example, when a fish is hooked, the device moves the rod horizontally or vertically to keep tension on the line. In another embodiment, the system 24 is provided with a screen displaying information about system operation. In other embodiments, the system 24 is provided with a touch screen display. Buttons, dials, sliders, and other types of Graphical User Interface (GUI) elements are provided via the touch screen display (FIGS. 23-25). The touch screen display also displays information about system operation.

In other embodiments, two or more buttons are provided that trigger a combination of patterns, movements, or presentations. For example, pressing buttons A and B simultaneously can replay presentation A first, then B, and repeat until stopped by user action. In another example, pressing buttons A, B, and Random at the same time can rotate the presentations of A, B, and Random, and repeat the rotation until stopped by user action. Complex permutations and combinations can be achieved with a touch screen user interface or a remote mobile interface using wireless communication.

The "reset" (Re) button interrupts the system 24 and reverts the system 24 to a "free" state. In other embodiments, an optional power on/off button is provided (not shown). When power is turned on, the device is initially set to the "free" state.

The computer or microprocessor driven controller 12 can perform functions common to all computers, including voice commands, communicating wirelessly, sharing data and commands with other devices, upgrading firmware, as well as uploading and downloading sequences. For example, when the system 24 detects a fish strike, the controller 12 is operable to notify an electric fishing reel to reel in (see FIGS. 9-10). The system is also configurable to change the sequence of jigging based on the findings of a connected fish finder and control of the system can be achieved by a remote mobile device. In one embodiment, the controller 12 is an Arduino microcontroller that reads user inputs, such as turning of a potentiometer by a user, and sends commands to a motor, such as a servo, to move to a specific position based on the potentiometer reading. In another embodiment, the controller 12 is a Raspberry Pi that reads user inputs, such as turning of a potentiometer by a user, and sends commands to a motor, such as a servo, to move to a specific position based on the potentiometer reading.

In one embodiment, the driving device 10 is a servo motor. The servo motor can be a linear servo that extends or retracts straight or a rotary servo motor that rotates to a specific angle range. Servos can be instructed to move to a specified position by the controller 12. The sequential moves to a series of positions at different points in time in equal intervals construct a sequence of movements or fishing presentation.

In another embodiment, a linear actuator with position feedback can be used instead of a servo. The movement of the linear actuator is similar to that of a linear servo, but a non-servo linear actuator may not take a command to move to a specific position. However, a linear actuator with position feedback can send its actual position to the controller 12, and at the same time, the signal from the dial 14 or recording will establish the target position the actuator needs to move to. The controller 12 can compare the actual position received from feedback with the target position. If the actual position is already at the target position, the controller 12 can disconnect the power of the actuator to effectively stop it at the position. Otherwise, it sends power to the actuator to move it towards the target position. Altering the power polarity affects which direction that the actuator moves. For example, if the power polarity is positive, the actuator extends: if the power polarity is negative, the actuator retracts.

In another embodiment, multiple motors may be used simultaneously to supply more power, or move different components, or move in different directions. To overcome water resistance and rod weight, more force or torque may be needed, which can be solved by using larger motors. However, the size of larger motors may not fit in the edges of a watercraft. In an alternative embodiment, two or more motors, such as linear servos, are used simultaneously to supply larger combined force but without significantly increasing the size of the device. Expansion spring 22 and torsion spring 910 are but two techniques described to address force or torque challenges.

In another embodiment, a stepper motor can be used instead of a servo. Sensors are included along with the driving device 10 to provide data on the angle between the drive plate 6 and the housing 20. This angle information is used to calculate how many steps for the stepper motor to move forward or backward. A reverse movement of a stepper motor may be achieved by reversing the polarity of power supply to the motor via a controller.

Figure 2:
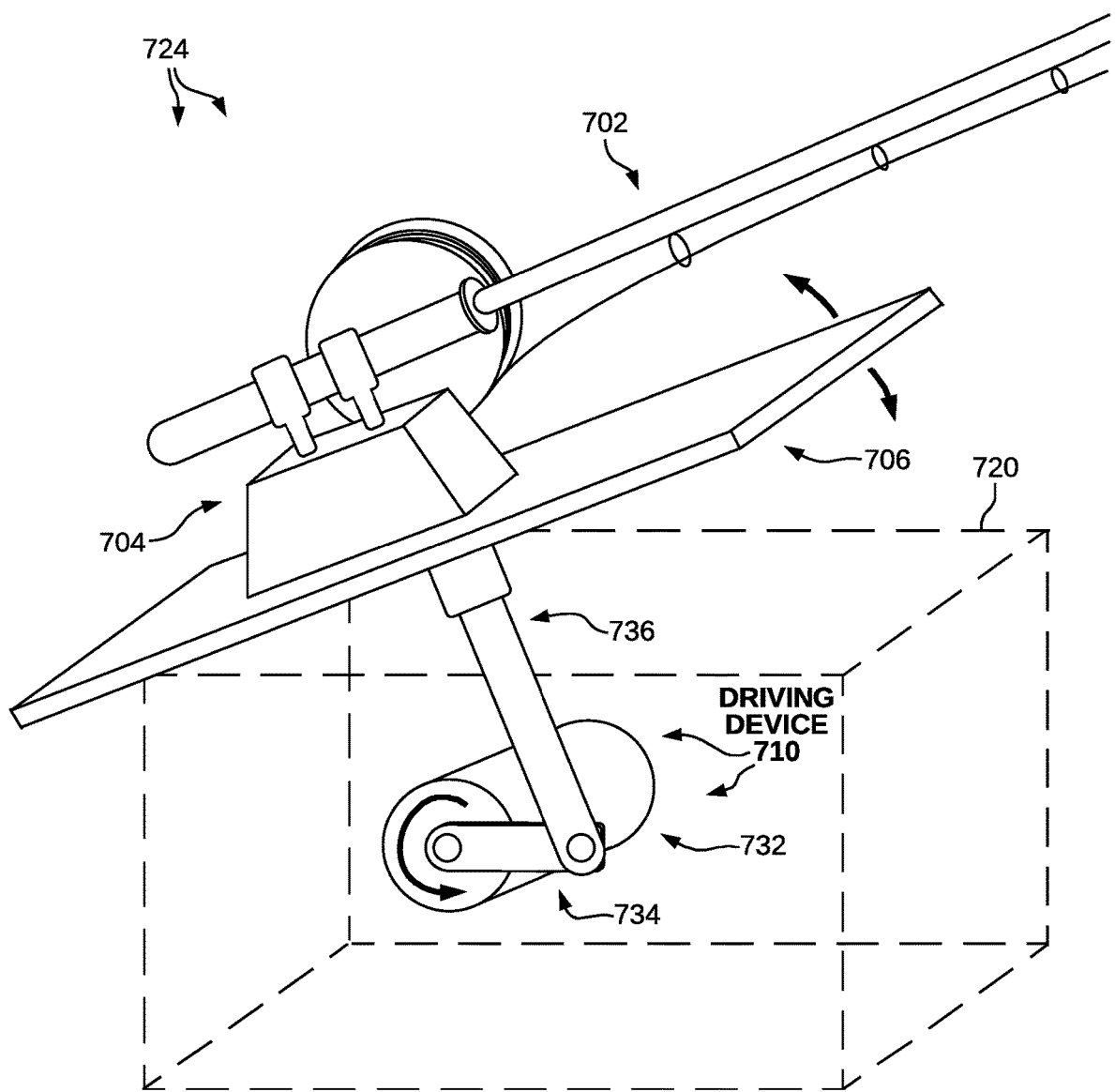
FIG. 2 is a diagram of a system 724 in accordance with another embodiment.

In another embodiment, a cam mechanism is used to transform the rotational movement of a rotary motor to a linear motion normal to the drive plate 6 (See FIG. 2). In another embodiment, linkage between a rotary motor and the drive plate 6 can be an arm or horn with at least one roller (described in detail below in FIGS. 3-6) that directly, drives the bottom surface (drive surface) of the drive plate 6. In yet another embodiment, multiple motors may be used to move different components, or move in different directions. The system 24 can have a separate motor that drives the pivot angle of the rod holder 4 in a plane parallel to the drive plate 6. A separate motor may be used to move the housing 20 in the horizontal plane parallel to the surface that the housing 20 is mounted on. The controller 12 can interact with a plurality of driving devices.

In another embodiment, a conventional rod holder 4 can be used as the receptacle component of the device by mounting the conventional rod holder base on the drive plate 6. In another embodiment, drive plate 6 can be implemented like a door or cover with a hinge. In another embodiment, drive plate 6 can be implemented like a see-saw extending in both directions of the hinge. In another embodiment, in a see-saw embodiment, one or more expansion springs 22 can be added to partially offset the rod weight and water resistance when driving the rod to swing upward. The tension or torque of the expansion spring 22 can be changed by adjusting the distance between hinge and the attaching point of the spring at the bottom of the drive plate, or distance between hinge and the attaching point of the spring to the housing. The farther away the attaching point is from the hinge, the more torque it provides. In another embodiment, an adjustable torsion spring with an adjustment handle can be employed along the hinge axis. The use of a torsion spring in the device is to reduce the force needed by the motor to lift the drive plate up quickly amid water resistance and rod weight. In another embodiment, a seesaw drive plate is used and the rod holder 4 may be installed on either (rod tip or rod end) side of the hinge. In another embodiment, the housing 20 has a swivel base that is mounted on a watercraft or another stationary object. The addition of a swivel base allows for horizontal plane pivoting and mounting or dismounting of housing 20. In another embodiment, drive plate 6 includes additional downward overhangs on the edges to prevent water from entering the housing 20 interior. In another embodiment, system 24 includes flexible shields or curtains that surround the housing 20 and couple the housing 20 to the drive plate 6, which protects the housing 20 interior from water and other weather elements (e.g., wind, rain, or dust).

In another embodiment, the controls and buttons can be any shape or form, such as linear instead of rotational, as long as they achieve the same logic to be interpreted by the processor or computer. In another embodiment, a full clockwise turn of the "move/teach" dial moves the drive plate fully down instead of fully up. This can be dependent on the motor used, device configuration, or personal preference. In another embodiment, the system can be used on shore or on a watercraft, which can be static or moving. The system 24 is also attachable to a fixed surface, such as in ice fishing.

FIG. 2 is a diagram of a system 724 in accordance with another embodiment. In the embodiment shown in FIG. 2, system 724 comprises a rod holder 704, a driving device 710, and a housing 720. FIG. 2 shows a fishing rod 702 placed in rod holder 704 and the rod holder 704 is coupled to a drive plate 706. Although not shown, system 724 includes a controller 712, an input device 714, a user interface 716, a power supply 718, and a spring 722. In one embodiment, each of the controller 712, the input device 714, the user interface 716, the power supply 718, and the spring 722 is operable similarly to the controller 12, input device 14, user interface 16, power supply 18, and spring 22 described in the detailed description in FIG. 1, respectively.

In the embodiment shown in FIG. 2, driving device 710 includes a rotary motor 732, a first arm (or servo horn) 734, and a second arm 736. The rotary motor 732 is coupled to an interior surface of housing 720 and is coupled to the drive plate 706 via arms 734 and 736. The driving device 710 is powered via power supply 718 and is coupled to the controller 712.

The Servo horn 734 is affixed to an axis of the motor 732. The motor 732 drives the servo horn 734 causing the servo horn 734 to radially rotate around the axis of motor 732. Rotation of the servo horn 734 causes the second arm 736 to move, which in turn moves the drive plate 706. For example, when the motor 732 drives the servo horn 734 to radially rotate counterclockwise, the second arm 736 remains rigid and applies a normal force on the drive plate 706. Because one end of the drive plate 706 is coupled to the housing 720 via hinge 708 (not shown), normal force on the drive plate 706 causes the drive plate 706 to radially rotate about the hinge 708 in another example, the motor 732 drives the servo horn 734 to radially rotate clockwise and the second arm 736 remains rigid and applies a pulling force on the drive plate 706. Various pins or joints are used to connect the motor 732 to the servo horn 734 and the servo horn 734 to the second arm 732 that are freely rotatable in the counterclockwise or clockwise direction. It is appreciated that the drive plate 706 is mountable in any suitable fashion to housing 720 such that the drive plate 706 is movable in accordance with techniques described herein. In other embodiments, the drive plate 706 is attached via pivot support that provides rotation about more than one axis. In one example, the drive plate 706 is rotatable about two axes, three axes, or six axes.

Figure 3:
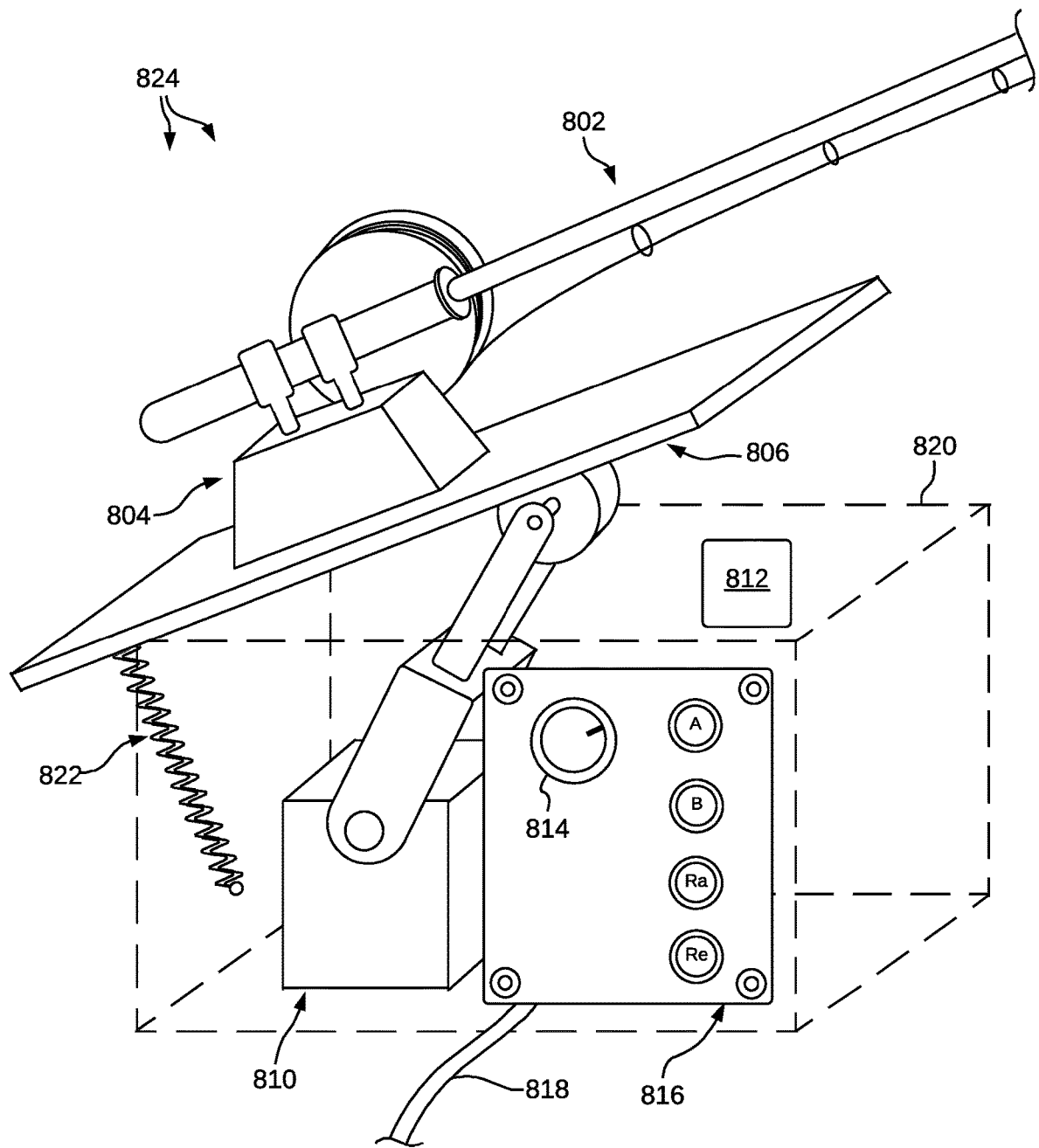
FIG. 3 is a diagram of a system 824 in accordance with another embodiment.

FIG. 3 is a diagram of a system 824 in accordance with another embodiment. In the embodiment shown in FIG. 3, system 824 comprises a rod holder 804, a driving device 810, and a housing 820. FIG. 3 shows a fishing rod 802 placed in rod holder 804 and the rod holder 804 is coupled to a drive plate 806, The system 824 of FIG. 3 includes a spring 822 attached to the drive plate 806 and housing 820, which assists the driving device 810 in moving the drive plate 806. System 824 also includes a controller 812, an input device 814, a user interface 816, and a power supply 818, In one embodiment, each of the controller 812, the input device 814, the user interface 816, and the power supply 818 is operable similarly to the controller 12, input device 14, user interface 16, and power supply 18 described in the detailed description in FIG. 1, respectively, Although not shown, the drive plate 806 is coupled to housing 820 via hinge 808. It is appreciated that the drive plate 806 is mountable in any suitable fashion to housing 820 such that the drive plate 806 is movable in accordance with techniques described herein. In other embodiments, the drive plate 806 is attached via pivot support that provides rotation about more than one axis. In one example, the drive plate 806 is rotatable about two axes, three axes, or six axes.

Figure 4:
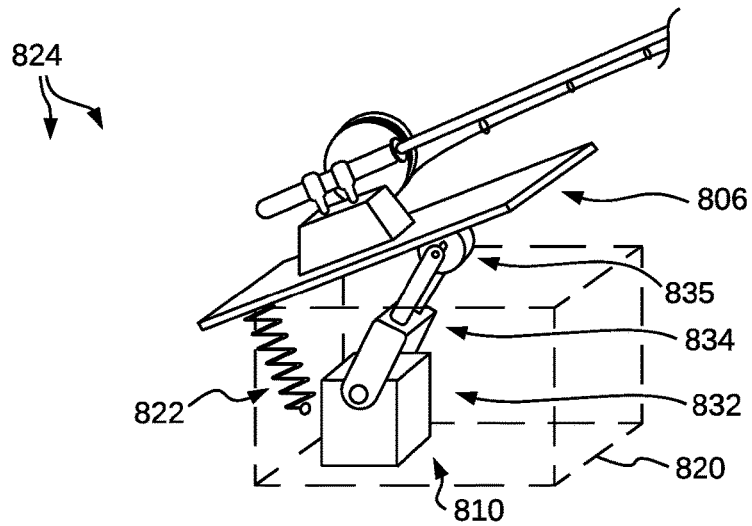
FIGS. 4-6 are diagrams of the system 824 in accordance with other embodiments.
Figure 5:
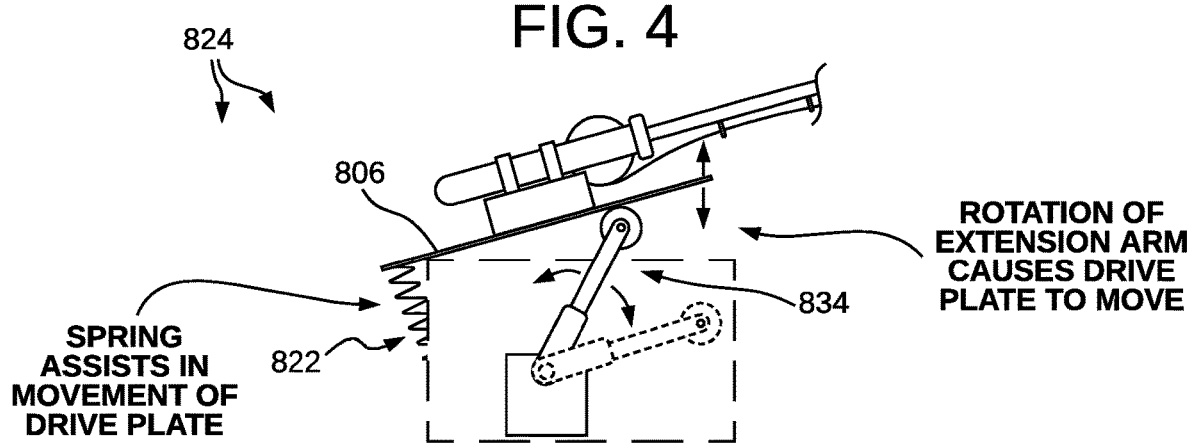
Figure 6:
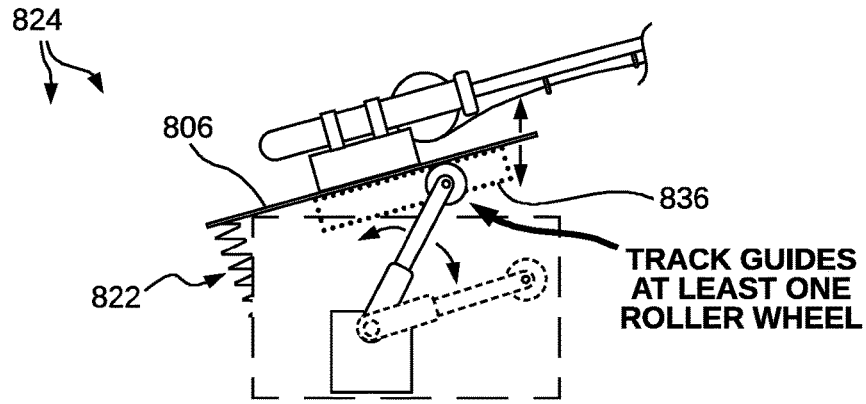

FIGS. 4-6 are diagrams showing various views of system 824. The embodiment shown in FIGS. 4-6 shows the driving device 810 of system 824 including a rotary motor 832 coupled to an extension arm 834 with at least one roller wheel 835. FIG. 4 shows motor 832 coupled to the housing and the at least one roller wheel 835 disposed on the drive plate 806 which provides support for the rod holder 804 and the fishing rod 802. FIG. 5 shows an example of motor 832 driving the radial rotation of extension arm 834, causing the at least one roller wheel 835 to travel along the drive plate 806. In this example, counterclockwise rotation of extension arm 834 will move the drive plate 806 up. Spring 822 assists driving device 810 in moving the drive plate 806. In another example, counterclockwise rotation of extension arm 834 will move the drive plate 806 down, which can be assisted by gravity. In another embodiment, system 824 extension arm 834 is attached to the drive plate 806 via a string or chain, which assists in pulling the drive plate 806 downward when rotating in the clockwise direction. FIG. 6 shows another embodiment of system 824 including a rectangular bracket 836 affixed to a bottom surface (or drive surface) of the drive plate 806. In the embodiment of system 824 which includes rectangular bracket 836, the rectangular bracket 836 provides a track for the at least one roller wheel 835.

Figure 7:
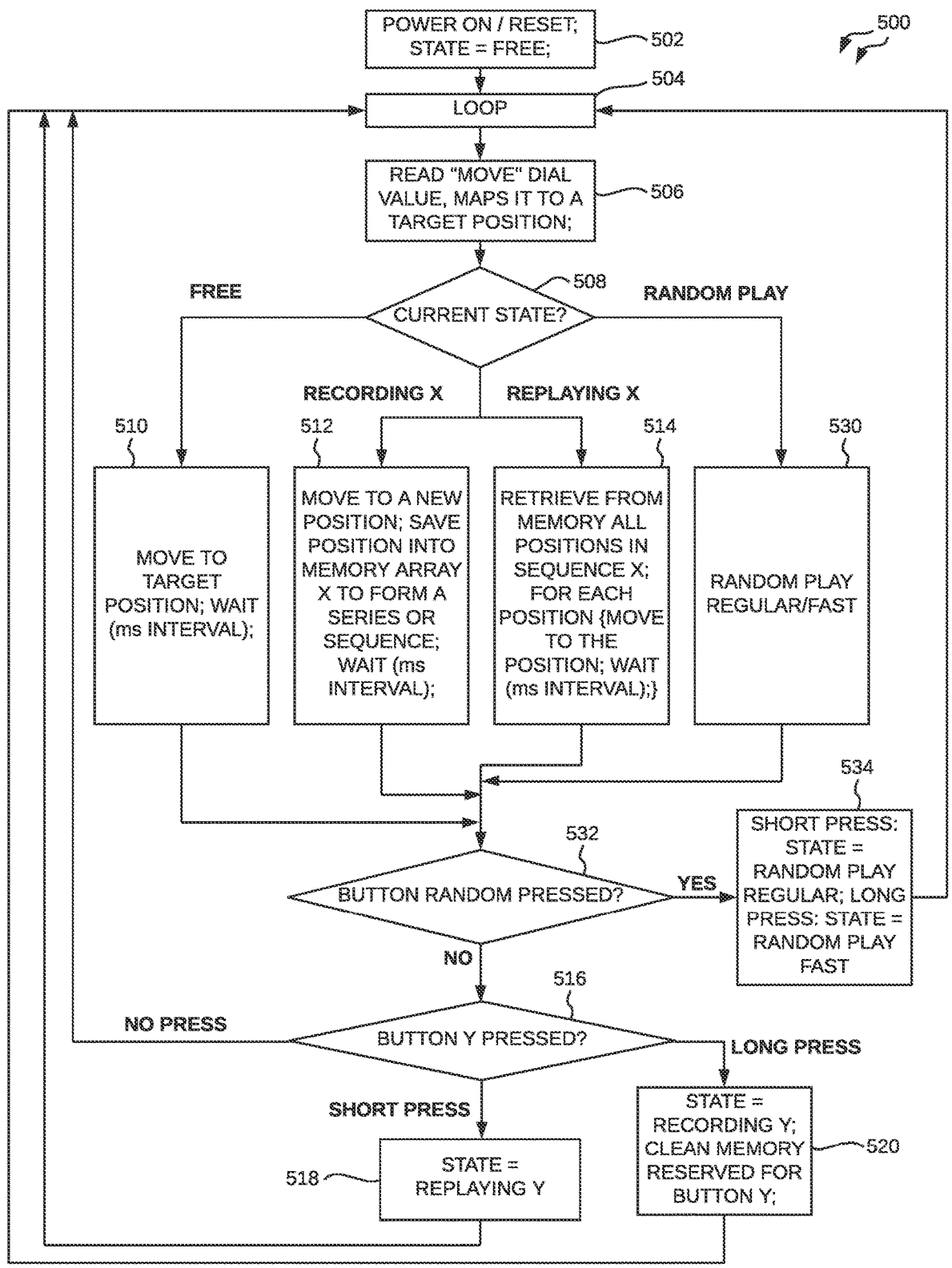
FIG. 7 is a flowchart 500 illustrating exemplary operational logic of controller 12.

FIG. 7 is a flowchart 500 illustrating exemplary operational logic of controller 12. In this embodiment, the controller 12 is operable in a free state, a recording state, or a replay state. In one embodiment, the controller 12 indicates to the user the current operating state via the user interface 16 (e.g., LED indicator).

In one example, when controller 12 is operable in the "free" state, the system 24 is not recording or replaying a sequence, and can move synchronously when a user turns the dial 14 (input device).

In one example, when controller 12 is operable in the "recording" state, the device is in the process of saving data points for a button as it moves synchronously when a user turns the dial 14 (input device).

In one example, when controller 12 is operable in the "replay" state, the device is in the process of recreating motion from data points saved for a button (e.g., Recording A button).

In one embodiment, system 24 includes multiple buttons that can be used to initiate a "recording" and/or a "replay" state., such as A and B), In the embodiment that includes multiple recording/replay buttons, each may be different states (or substates). For example, Recording A (recording state), Recording B (recording state), Replay A (replay state), and Replay B (replay state) are each different states.

In step 502, as power is switched on or reset button is pressed, the controller initializes, and the current state is set to "Free".

In step 504, the controller enters a loop (which is explained below) and a point where a repetitive cycle may be started.

In step 506, the controller always has the reading of the input device, dial 14. The dial is an analog input to the controller, in other words, the turning of this dial initiated by a user is giving orders to the controller, which then sends signals to the drive system. The analog input, or reading, is usually a number between a given range, such as 0 to 1023. For example, as a user turns the dial from one extreme to the other, the number changes from 0 to 1023. This analog input number can be mapped into the position of the motor or servo so that the controller can send a command to the motor to move to a specified position. For example, we are driving a linear servo with a range from 0 to 50 mm, and assuming we are using the full range, analog input range 0 to 1023 will be mapped to 0 and 50 mm. Accordingly, if the analog input is 300, the control would send a command to the linear servo to move to 300/1023*50 mm=14.66 mm position; if the analog input is 1000, the control would send a command to the linear servo to move to: 1000/1023*50 mm=48.88 mm, etc. The mapped target position is calculated here, and may or may not be used later, depending on the current state. For a rotary motor or servo, instead of being length, the mapped position can be an angle from 0 to 360 degrees.

In step 508, the controller decides the next action based on the current state.

In step 510, if the current state is "free", the controller drives the motor as a user turns the "move/teach" dial, almost synchronously. Controller pauses for a predefined period after each move, such as 50 microseconds, as technically a motor takes time to move to a target position, and may not finish instantly, although the pause may not be noticeable by humans.

In step 512, if the current state is "Recording X", where X represents one of the "recording/replay" buttons, such as A or B or C, etc., the controller does a reading of the "move/teach" dial 14. Then, the controller sends a signal to the motor to move to the mapped target position as determined in 506. Then, the controller saves the reading to the array X to form a series or sequence or presentation and waits for a predefined period (usually microseconds). If recording has used up all the memory space allocated for button X, it will skip saving new readings into memory. If no button is pressed, the state is not changed and the controller goes back to loop to do another analog read and record the next data point. This step records one step of a sequence or one data point in each loop.

In step 514, if the current state is "Replay X", where X represents one of the "recording/replay" buttons, such as A or B or C, etc., then the controller fetches all saved reading sequentially for button X. For each reading, the controller sends a command to the motor to move to the mapped position based on the reading. The controller waits for a predefined time interval after each move until all recorded positions for the button X are exhausted.

The controller starts to recreate the moves by retrieving the first reading saved for button X, execute the move, wait for the same time interval used during recording, if no other button is pressed to change the state, device loops back and retrieves the next reading and executes the move to the next position, then wait for the predefined interval, and so on until it reaches the end of the recording. After it reaches the end of the recording, the device goes back to execute the first saved reading again, then the second, and so on. As a result, the device does the replay automatically, and repetitively.

The step executes one move to the next saved readings in each loop.

In step 530, "Random Play". There can be multiple random play states. In a preferred embodiment, there are two Random Play states: "Random Play Regular", after a short press of the Random (Ra) button and "Random Play Fast" after a long press of the Random (Ra) button. In either state, the controller uses a randomly generated position as the next target position and then drives the servo or motor to the target.

Random Play Regular creates smoother moves towards the target, by using pauses along the way toward the target.

Random Play Fast creates sudden moves directly toward the target with fewer or no pause along the way, but a longer pause is added once it's reached the target. Such a sudden jerking move can attract certain species of fish, particularly on the upward movement.

During Random Play, the move/teach dial reading can also be used to control the range of random movement. For example, assuming that in the "Free" state, the Move/Teach dial moves from one extreme to the other would move the lure up and down by 2 meters. The placement of the dial in the middle of its range would limit the Random Play range to 1 meter of lure movement up and down. The placement of the dial at a ¼ of its range would limit the Random Play range to 0.5 meters of lure movement up and down, and so on. This is useful to target certain species of fish.

In step 532, check if the button "Random" is pressed. If it is determined that the button "Random" is pressed. the method proceeds to step 534, where it is identified if the press is a short or long press Short press: State=Random Play Regula; Long press: Rand©m Play Fast. The method then proceeds back to step 504.

If it is determined that the button "Random" is not pressed, the method proceeds to step 516. In step 516. check if any of the "recording/replay" ("Y") buttons are pressed. The button pressed may or may not be the one currently in recording or replaying. If no button is pressed, the state is not changed, control goes back to loop step 504.

In step 518, if there is a short press of button Y, the controller state is set to replay Y. Note that Y could be different from X, and there could be a recording or replay X in progress when Y is pressed, and recording or replay X would stop in this case, and the next loop would be doing replay Y.

In step 518, if there is a long press of button Y, the controller state is set to recording Y. However, if it is already in the process of recording Y, no action is taken here. Otherwise, current recording or replay will stop and memory for Y will be cleaned. After that, control goes back to loop 504.

Any time the Reset (Re) button is pressed, or power recycled, the controller goes back to starting position 502. It is possible for a reset to occur even during a replaying in e.g., step 514.

Two or more buttons can be used to trigger combination patterns of movements or presentations. For example, press A and B simultaneously can replay presentation A first, then B, and repeat until stopped by user action; Press A, B and Random at the same time can rotate the presentations of A, B, and Random, and repeat the rotation until stopped by user action.

In another embodiment, a controller can have multiple different states at a given moment, as the controller manages many tasks, such as commanding other devices and different dimensions of movements of the same device.

Figure 8:
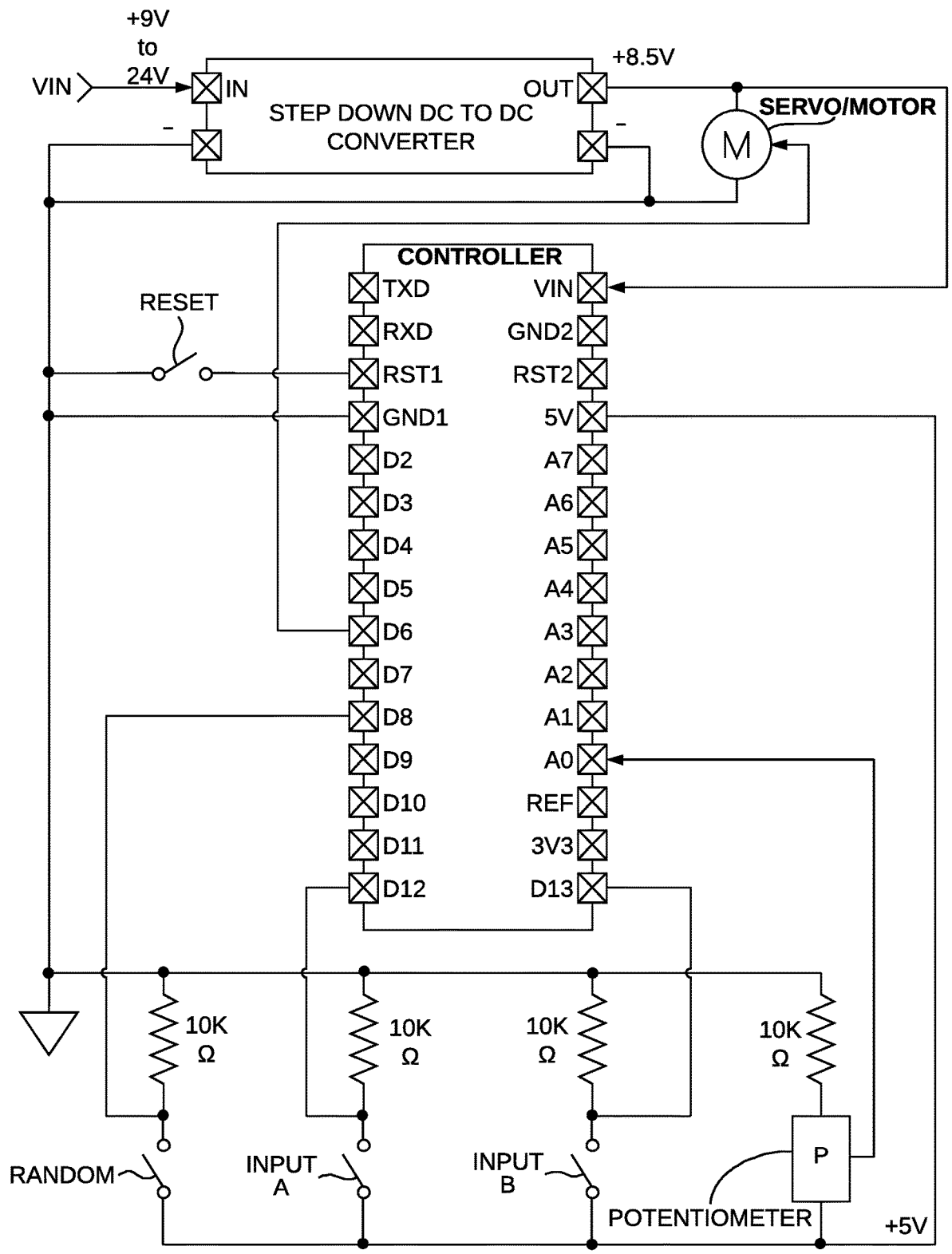
FIG. 8 is a diagram of exemplary circuitry of controller 12.

FIG. 8 is a diagram of exemplary circuitry of system 24. In this example, an Arduino Nano processor is used as the controller 12. A program or sketch that executes the flow as described in FIG. 6 is loaded to the processor. A DC to DC converter is used to convert any voltage from 9V to 24V down to a voltage that works best for both the driving device (e.g., servo motor, rotary motor) and Arduino. The converter output is adjustable. Arduino input voltage can be 7V to 12V, so if the motor requires 8.5V for best performance, the converter output is adjusted to 8.5V, which supplies power to both Arduino and the motor.

Buttons A, B, Random, and Reset are push button switches that are normally off, momentary on when pushed down. The "Move/Teach" dial (input device 14) is a potentiometer.

Figure 9:
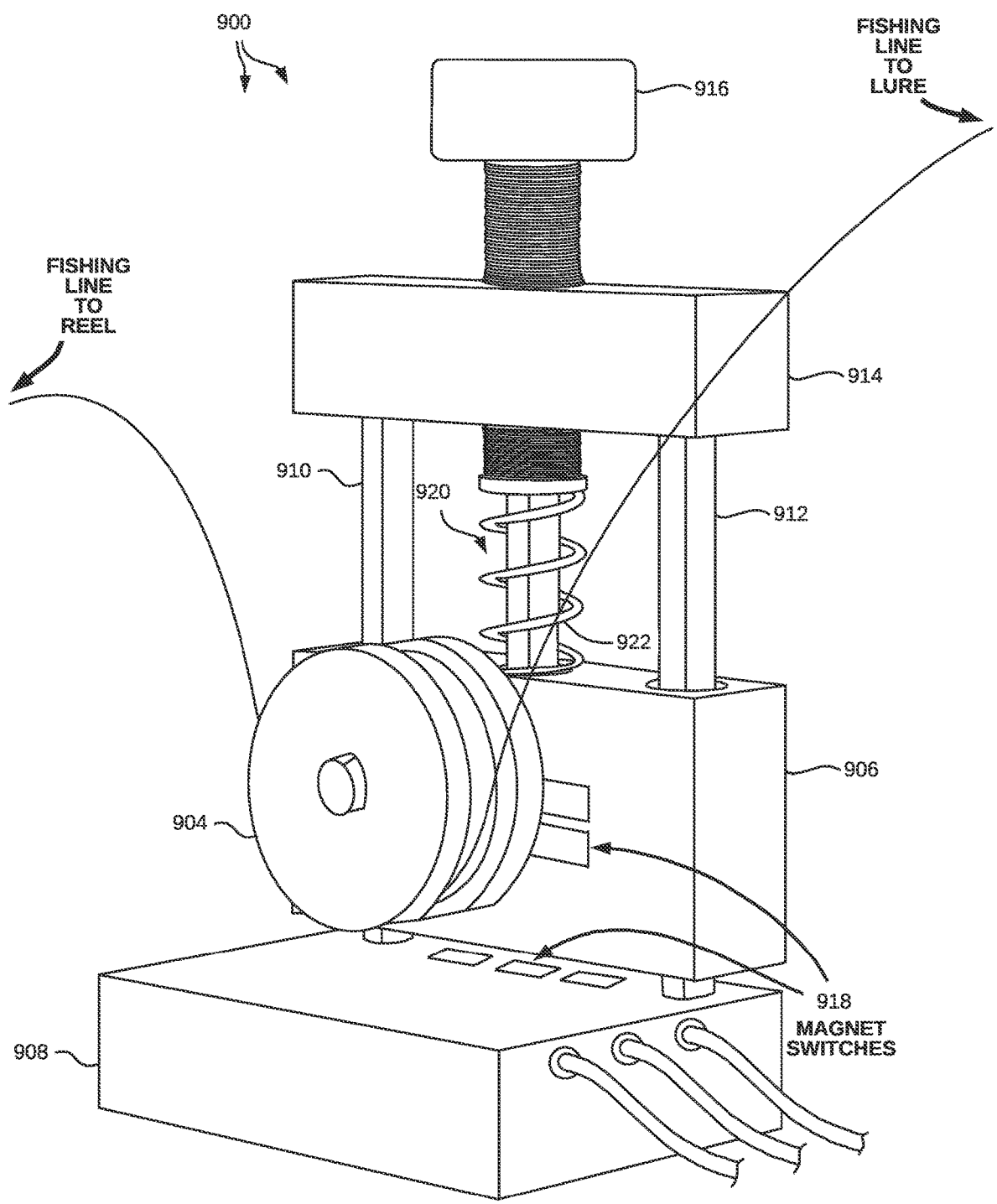
FIG. 9 is a diagram of a perspective view of a novel fish on detector 902.
Figure 10:
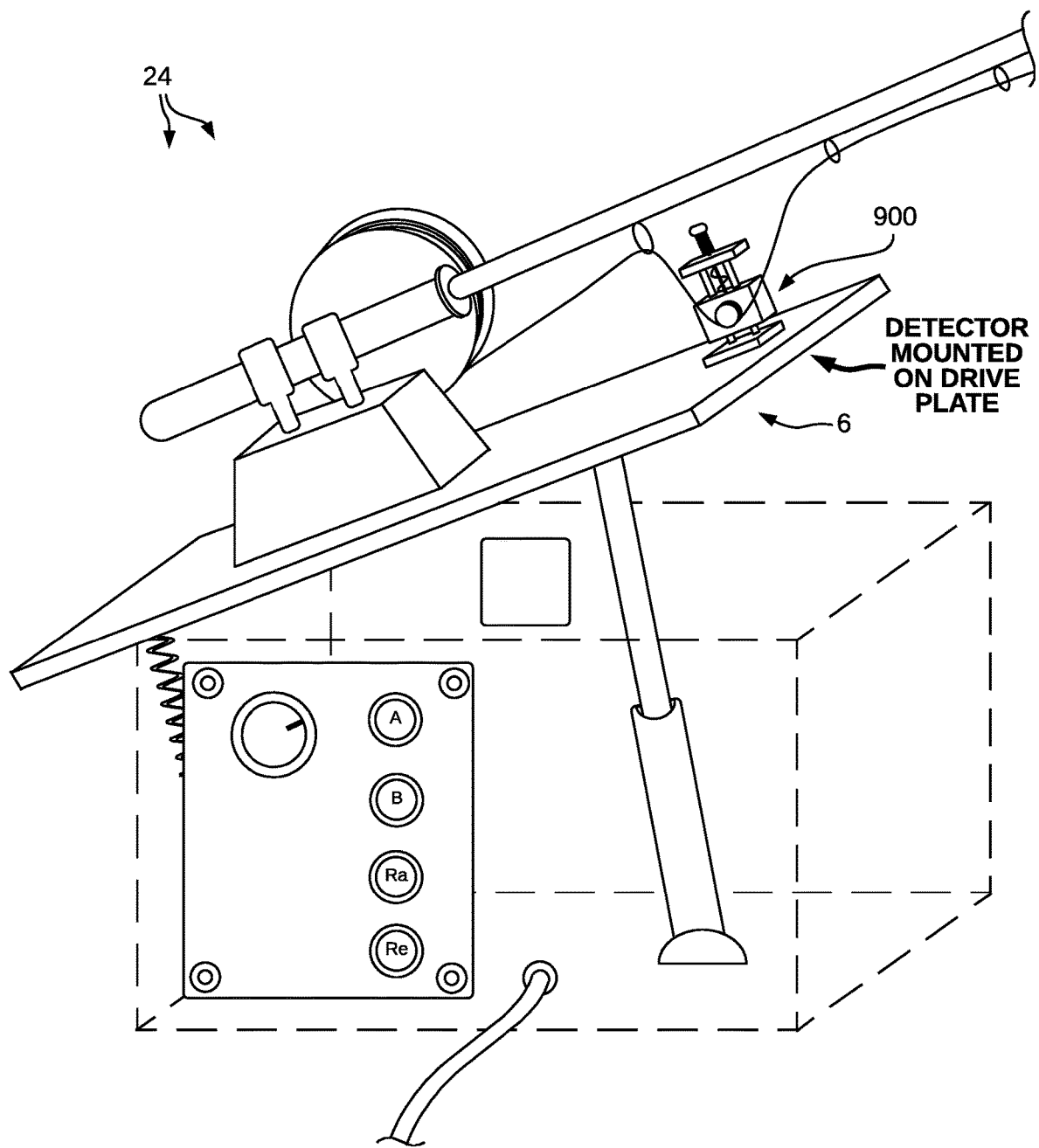
FIG. 10 is a diagram of an embodiment of system 24 with the novel detector 902.

FIG. 9 is a diagram of a perspective view of a novel fish on detector 900. The detector 900 includes a pulley (rotatable wheel) 904, a sliding block 906, a base 908, a first pole 910, a second pole 912, a block 914, a spring mechanism 920 having a bolt 916 and a spring 922, and at least one magnetic switch 918. In one embodiment, the base 908 is affixed to a top surface of a drive plate. example, FIG. 10 shows an exemplary placement of detector 900 that is mounted on a drive plate.

Poles 910 and 912 extend from and are affixed to the base 908 and the top block 914. Fishing line 902 is placed around the pulley 904. in one example, fishing line 902 could be pulled from between two rings of the rod, or between the reel and the ring closest to the reel. The pulley 904 is mounted on sliding block 906, which can move up and down along poles 910 and 912. The bolt 916 has a threaded portion screwed into the block 914. The non-threaded rod portion of bolt 916 is a smaller diameter rod that is used to hold a spring in place The non-threaded rod portion of bolt 916 can fit loosely into the middle hole of block 906. The spring 922 has a smaller diameter than the threaded portion of 916 and the middle hole of sliding block 906. Therefore, tightening bolt 916 will compress the spring 922 and press block 906 downward.

Magnet switches 918 are placed between the base 908 and the sliding block 906 and between pulley 904 and the surface of 906 directly facing the pulley. The pulley 904 can have magnet stripes, and when the pulley rotates, the switch on block 906 will detect on and off signals. Also, the bottom of the sliding block 906 has a magnet. The area of 908 facing the bottom of 906 has a magnetic switch which is turned on/off if the distance between block 906 is above a threshold distance.

One way to detect a fish strike is when the pulley 904 moves up. Fish pulling the line may lift the sliding block 906 up, triggering a signal from one of the magnetic switches. The signal will be sent to the controller, which could lift the rod to set the hook and alert the user. In one embodiment, the triggering of the magnetic switch would cause the controller logic to be set to a "Free" state. In another embodiment, a system includes an electric reel that receives a signal from one of the magnetic switches which causes the electric reel to rotate and reel in the fishing line.

Another way to detect a fish strike is when pulley 904 rotates. A second signal may be generated when the pulley 904 rotates. A user may tighten or loosen bolt 916 to adjust the sensitivity of the spring mechanism 922 of detector 900. In one example, the bolt 916 is tight, the sliding block 906 would not move easily, and a small fish strike may not be detected. This is because the force required to move the sliding block 906 would need to be greater than the resistance of the spring 920 in the spring mechanism 922. In another example, the bolt 916 is loose, smaller fish can be detected because the threshold amount of force required to trigger the magnetic switch is low.

FIG. 10 is a diagram of another embodiment of system 24 with the novel detector 900. FIG. 10 shows an exemplary arrangement of the fish on (fish strike) detector 900 in system 24. In this example, detector 900 is disposed on the drive plate 6 of system 24. In another example, detector 900 is disposed on the exterior of housing 20. In yet another example, detector 900 is affixed to the rod holder 4 and is coupled to an electric reel and the controller 12.

Figure 11:
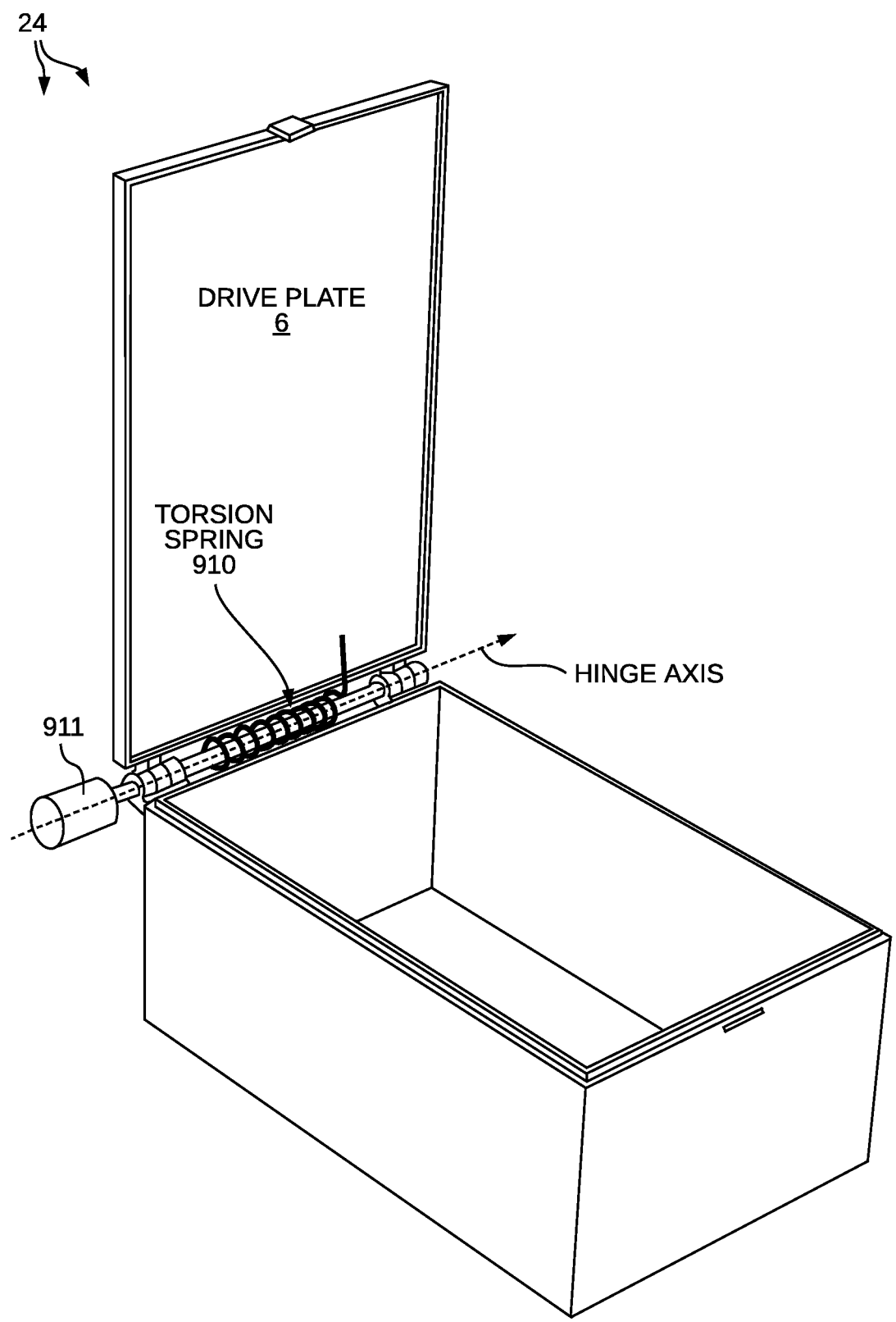
FIG. 11 is a diagram of another embodiment of the system 24 having a hinge with an adjustable torsion spring 910.

FIG. 11 is a diagram of another embodiment of a system 24 having a hinge with an adjustable torsion spring 910. In this embodiment, one end of the torsion spring 910 is affixed to a hinge axis and another end applies force to the drive plate 6. A knob 911 disposed on one end of the hinge is turned to increase or decrease pressure applied from the torsion spring 910 to the drive plate 6. A locking mechanism is provided that locks the angle or position of the knob 911 after an adjustment has been made to maintain the desired pressure applied to the drive plate 6. In one embodiment, the locking mechanism is provided via a locking nut along the hinge axis.

Figure 12:
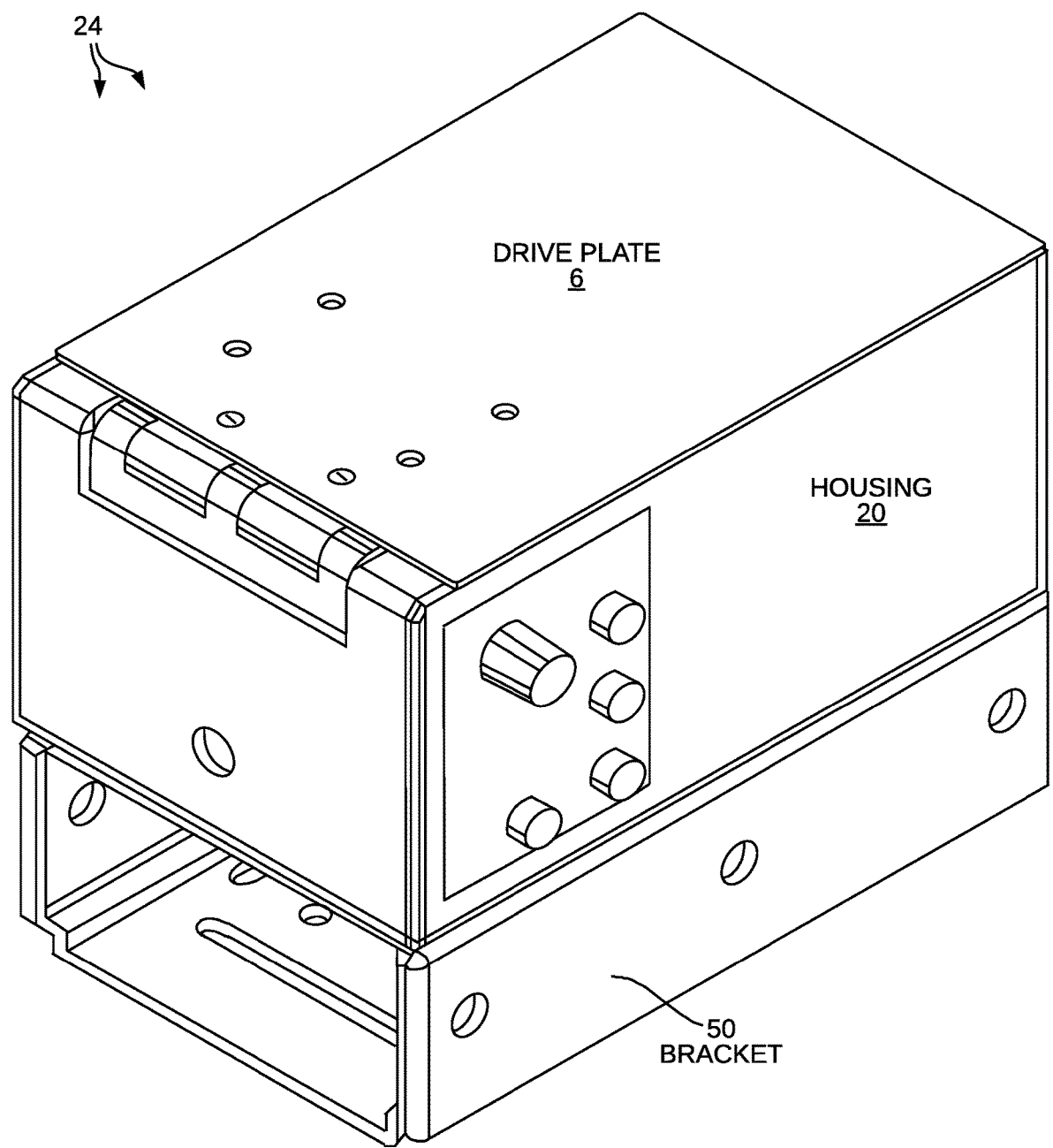
FIGS. 12 and 13 are diagrams of perspective view embodiments of system 24.
Figure 13:
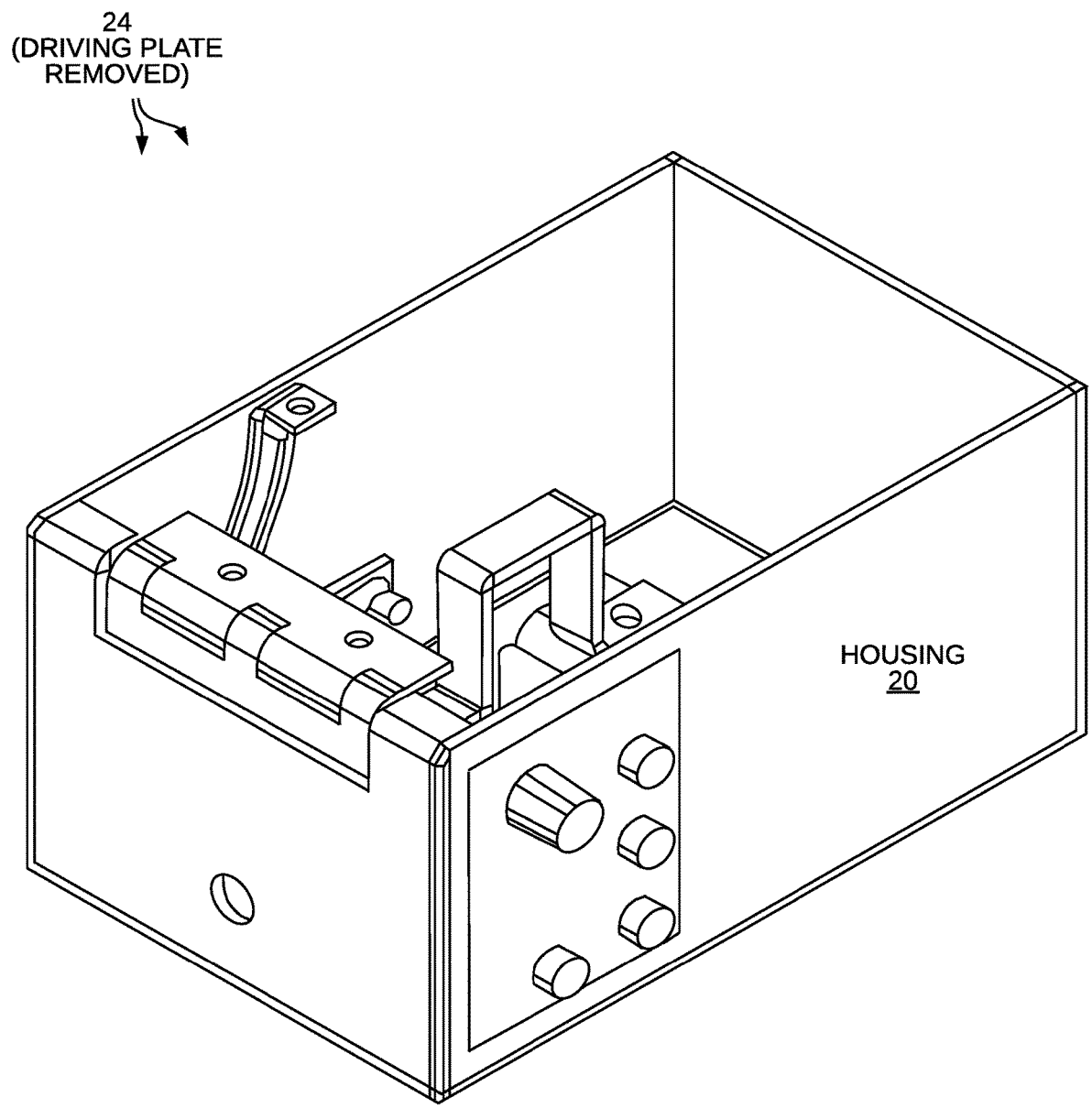

FIGS. 12-13 are diagrams of perspective views embodiments of system 24. FIG. 12 shows an example of system 24 including a bracket 50. Bracket 50 is a standard bracket that is mountable to a boat or other mounting surface. The drive plate 6 includes holes that are configured to attach to a rod holder.

FIG. 13 is a diagram of a perspective view of an embodiment of system 24 without drive plate 6. FIG. 13 shows exemplary 3D printed housing 20 with components. The housing 20 is formable via an additive manufacturing process, via an injection molding process, via a CNC machining process, or any other suitable manufacturing process.

Figure 14:
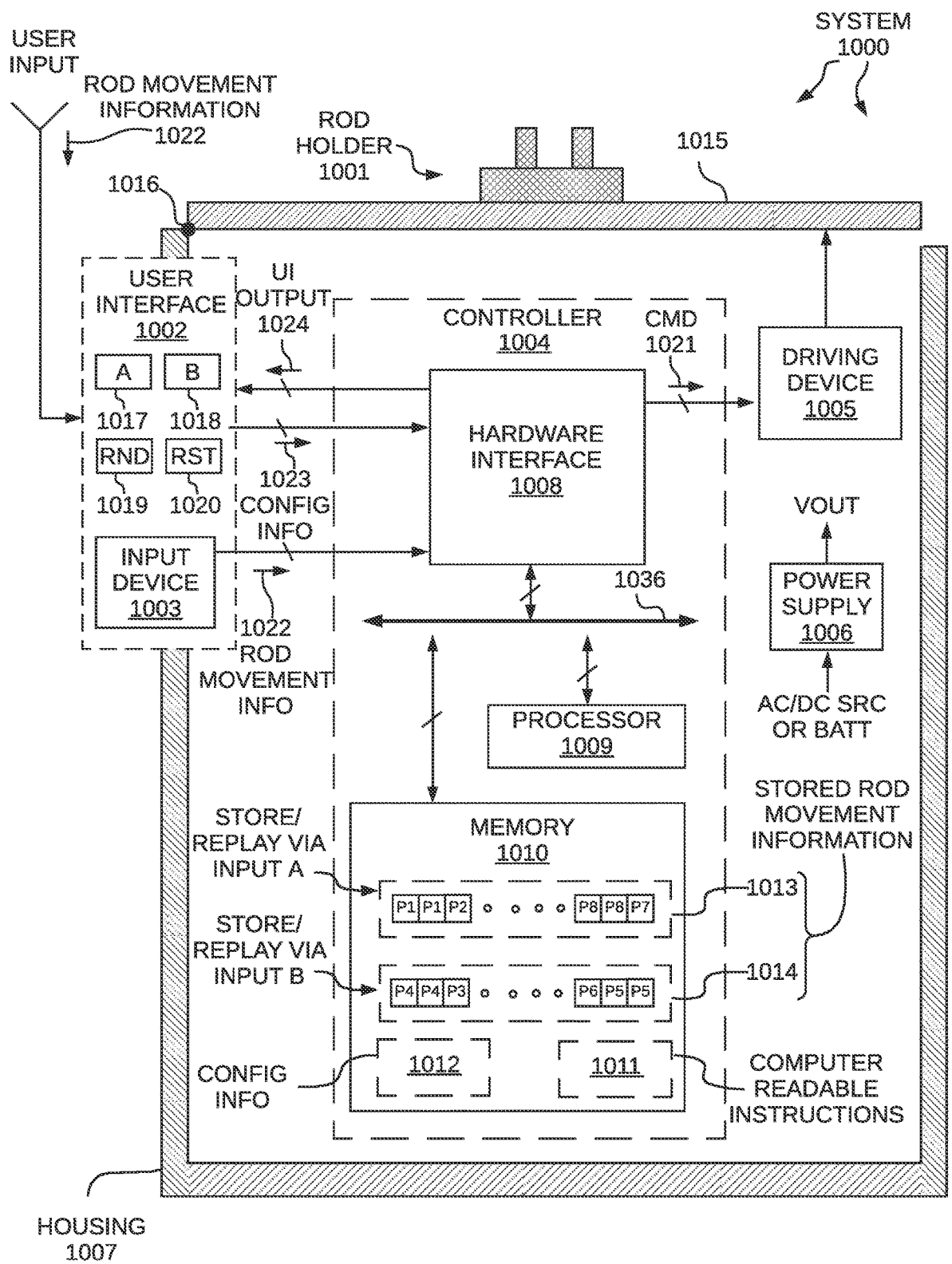
FIG. 14 is a diagram of a system 1000 in accordance with another embodiment.

FIG. 14 is a diagram of a system 1000 in accordance with another embodiment. System 1000 is configurable to control one or more fishing rods to repeatedly perform a programmed or random sequence of jigging movements. System 1000 comprises a rod holder 1001, a user interface 1002 having an input device 1003, a controller 1004, a driving device 1005, a power supply 1006, and housing 1007. The controller 1004 comprises a hardware interface 1008, a processor 1009, memory 1010, and a data bus 1036. The memory 1010 stores an amount of computer-readable instructions 1011, configuration information 1012, and stored rod movement information 1013 and 1014. The processor 1009 is any suitable processor capable of interpreting or executing instructions. The hardware interface 1008 is any suitable hardware capable of interfacing with input or output devices, such as mechanical inputs, keyboards, sensors, cameras, microphones, and touch displays. Memory 1010 is a computer-readable medium that includes any kind of computer memory such as floppy disks, conventional hard disks, CD-ROMS, Flash ROMS, non-volatile ROM, RAM, and non-volatile memory. The processor 1009 reads instructions 1011 from memory 1010 over data bus 1036 and controls the rod holder 1001 to move based on stored rod movement information, based on a random generated movement sequence, or based on real time user input.

One or more fishing rods are supported by the rod holder 1001. The rod holder 1001 is any suitable instrument that retains one or more fishing rods. The rod holder 1001 is movably attached to a surface 1015 of the housing 1007. Surface 1015 is attached to the housing 1007 via a hinge 1016. In another embodiment, the surface 1015 is not directly attached to the housing 1007 via hinge 1016 and is instead supported by and coupled to the driving device 1005. to other embodiments, the surface 1015 is not flat and is a curved or non-linear surface.

The housing 1007 houses and protects various components of system 1000. The housing 1007 also provides structural support for rod holder 1001 to jig in accordance with rod movement information, stored rod movement information, or random movement sequences. The housing 1007 is operable in a variety of different environments. In one example, the housing 1007 attaches to a boat surface. In another example, the housing 1007 is attached to an ice pond surface. In one embodiment, at least one spring is coupled to engage the rod holder 1001. Such a spring reduces the amount of force driving device 1005 has to output to move the rod holder 1001.

The user interface 1002 includes input device 1003 in addition to other user inputs. in this example, user interface 1002 includes input A 1017, input B 1018, input RANDOM (RIND) 1019, and input RESET (RST) 1020. Input A 1017 and input B 1018 are programmable to store rod movement information associated with jigging sequences to be carried out by the system 1000. Reference numeral 1013 identifies a portion of memory 1010 that stores rod movement associated with input A 1017. Reference numeral 1014 identifies a portion of memory 1010 that stores rod movement associated with input B 1018. Input RANDOM 1019 causes system 1000 to carry out a random jigging sequence. Input RESET 1020 generates an interrupt signal that stops operation of the system 1000. In some embodiments, a factory reset functionality is provided that clears stored user inputs with factory default stored inputs. For example, if the input RANDOM 1019 is held down for a predetermined length of time (e.g., 7 seconds), the factory reset functionality is executed. In this example, each of the inputs is a button.

The input device 1003 is any suitable hardware that receives rod movement information. The input device 1003 is operable to detect user input in one or more dimensions, including 1-axis, 2-axes, 3-axes, or 6-axes. Rod movement information indicates desired movement of the rod holder 1001. The system 1000 controls the rod holder 1001 to mimic the rod movement information by storing rod movement information and controlling the rod holder 1001 based on stored rod movement information. The input device 1003 receives rod movement information from user input via input device 1003. In the example of system 1000, the input device is a potentiometer. In various other embodiments, the input device 1003 includes at least one of a control pad, directional keys, a joystick, a wheel, a touch display, a motion sensor, an eye movement sensor, a head tracking sensor, and a brainwave sensor. In this example of system 1000, the input device 1003 is connected to the controller 1004 via a wired connection. In other embodiments, the input device 1003 communicates rod movement information to the controller 1004 via a wireless connection, such as over Bluetooth, WiFi, or over a cellular network (5G/LTE).

The driving device 1005 is coupled to drive the rod holder 1001. The driving device 1005 is operable to control the rod holder 1001 in one or more dimensions, including 1-axis, 2-axes, 3-axes, or 6-axes, that correspond to received rod movement information. The controller 1004 translates rod movement information into a command signal CMD 1021 that controls the driving device 1005. The driving device 1005 is any suitable hardware that causes rod holder 1001 to move in accordance with rod movement information supplied by a user onto the input device 1003. In various other embodiments, the driving device 1005 includes at least one of a linear servo, a rotary servo, an actuator, a step motor, a mechanical mover, and a motor.

The power supply 1006 generates and outputs all necessary voltages and/or currents necessary to operate components of system 1000. The power supply 1006 is supplied by an Alternating Current (AC) voltage source, a Direct Current (DC) voltage source, or from a battery. In this example, the power supply 1006 is a step down converter that receives a voltage between +9V and +24V and outputs an +8.5V voltage VOUT.

During operation, rod movement information 1022 is supplied to the input device 1003 via user input. The rod movement information indicates at least one characteristic of rod movement including position, timing, direction, angle, or speed. The rod movement information 1022 is stored in memory 1010 as stored rod movement information 1013 and 1014. The controller 1004 receives configuration information 1023 via user interface 1002. The configuration information 1023 configures operation of system 1000 in accordance with a user's desired preferences. The configuration information 1023 controls whether the controller 1004 is storing rod movement information or whether the controller is controlling the rod holder 1001 based on stored rod movement information or based on random movement sequences. The controller 1004 generates and supplies user interface output 1024 to the user interface 1002. The user interface output 1024 includes indicators, LED output, or displays that provide feedback to a user during operation.

The controller 1004 controls the rod holder 1001 to repeatedly perform one or more sequences of movements using the stored rod movement information 1013 or 1014. For example, when a user selects input A 1017, processor 1009 reads stored rod movement information 1013 from memory 1010 over data bus 1008. In this example, the stored rod movement information 1013 stores a sequence of values that represent rod holder 1001 positions of a jigging sequence to be carried out. The processor 1009 loops through each position (P1, P2, etc.) in stored rod movement information 1013 and generates a command 1021 that causes driving device 1005 to move rod holder 1015 to a corresponding position in the jigging sequence. In one embodiment, the controller 1004 controls the rod holder 1001 to move synchronously with the rod movement information 1022 in real time while the rod movement information 1022 is being stored in the memory 1010. In another embodiment, the rod holder 1001 does not move synchronously as the rod movement information 1022 is stored.

Figure 15:
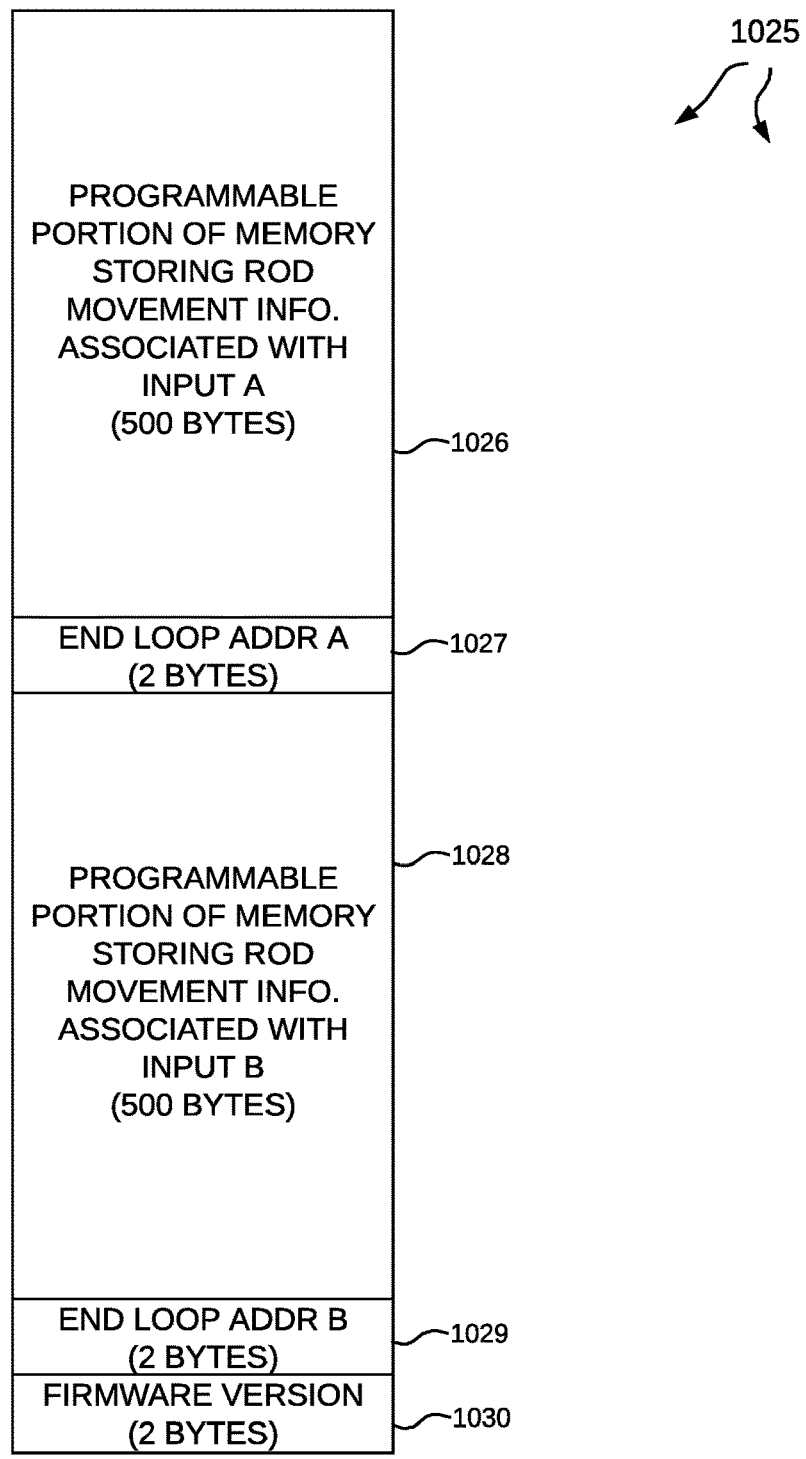
FIG. 15 is a diagram of a memory structure 1025 within memory 1010.

FIG. 15 is a diagram of a memory structure 1025 within memory 1010. The memory structure 1025 includes a first programmable segment 1026, a first end loop address segment 1027, a second programmable segment 1028, a second end loop address segment 1029, and a firmware version segment 1030. The first programmable segment 1026 stores rod movement information associated with input A. The first end loop address 1027 indicates an end memory address corresponding to and of a jigging sequence associated with input A. The second programmable segment 1028 stores rod movement information associated with input B. The second end loop address 1029 indicates an end memory address corresponding to and of a jigging sequence associated with input B. The firmware version segment 1030 stores firmware version information for future updates and maintenance.

Figure 16:
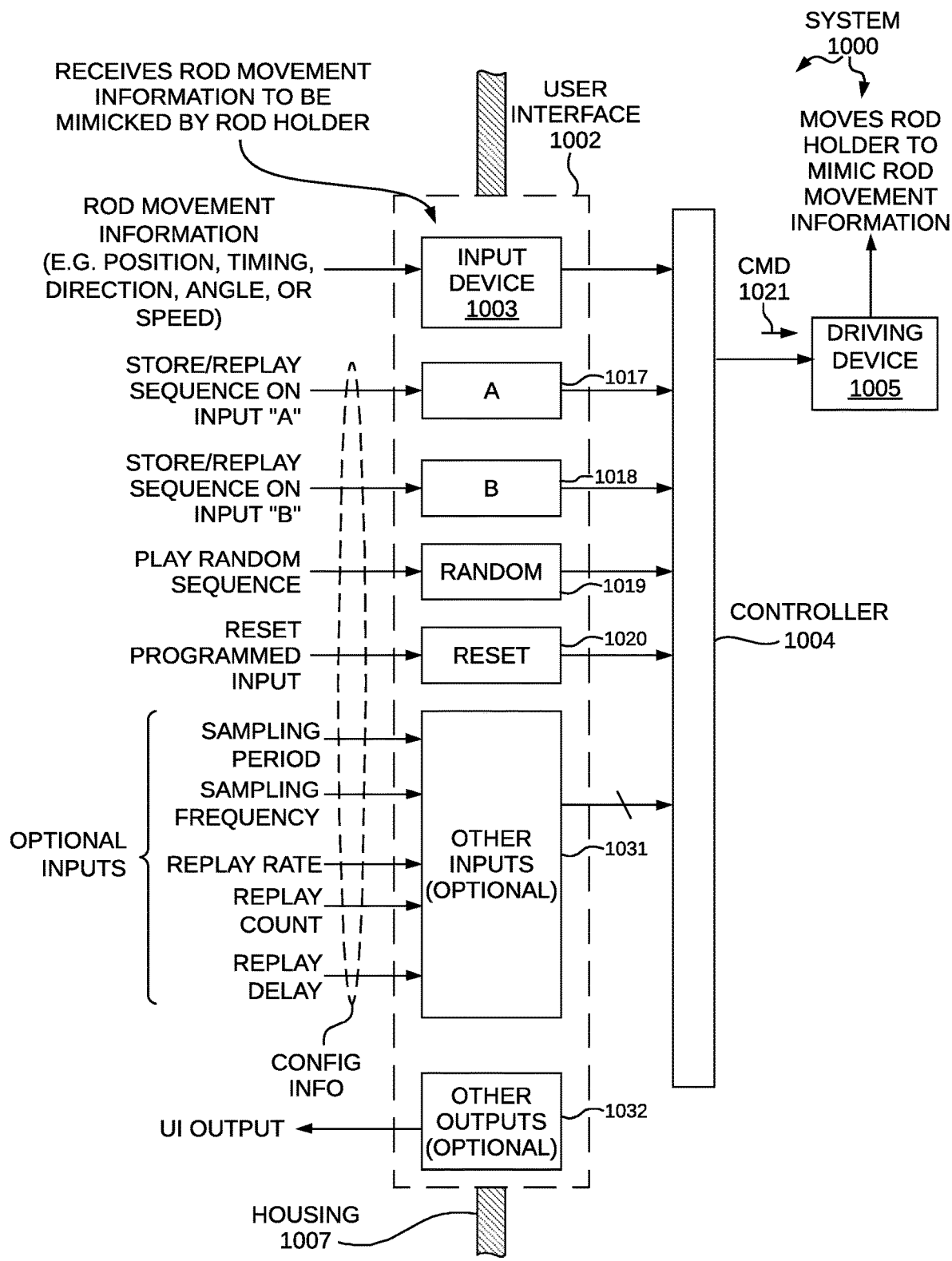
FIG. 16 is another diagram of user interface 1002.

FIG. 16 is another diagram of user interface 1002. The user interface 1002 includes input device 1003, input A 1017, input B 1018, input RANDOM 1019, input RESET (RST) 1020, and other optional inputs 1031. Rod movement information indicates desired movement of the rod holder 1001 and includes position, timing, direction, angle, or speed information. The system 1000 controls the rod holder 1001 to mimic the rod movement information by storing rod movement information and controlling the rod holder 1001 based on stored rod movement information. The input device 1003 includes at least one of a potentiometer, a control pad, directional keys, a joystick, a wheel, a touch display, a motion sensor, an eye movement sensor, a head tracking sensor, and a brainwave sensor.

Input A 1017 and input B 1018 are programmable to store rod movement information for new jigging sequences or to replay stored jigging sequences. Selecting input A 1017 causes system 1000 to control the rod holder 1001 based on stored rod movement information 1013 that is associated with input A 1017. Selecting input B 1018 causes system 1000 to control the rod holder 1001 based on stored rod movement information 1014 that is associated with input B 1018. Selecting input RANDOM 1019 causes system 1000 to carry out a random jigging sequence. Input RESET 1020 generates an interrupt signal that stops operation of the system 1000. Other optional inputs 1031 receive other operational parameters such as sampling period of rod movement information, sampling frequency of rod movement information, replay rate of stored rod movement information, number of repeated jigging sequences to be performed from stored rod movement information, and delay of when jigging sequences are to be performed. Outputs 1032 provide user feedback during operation of system 1000. Outputs 1032 are optionally included to enhance user experience, and include LEDs, display panels, or other visual indicators.

Figure 17:
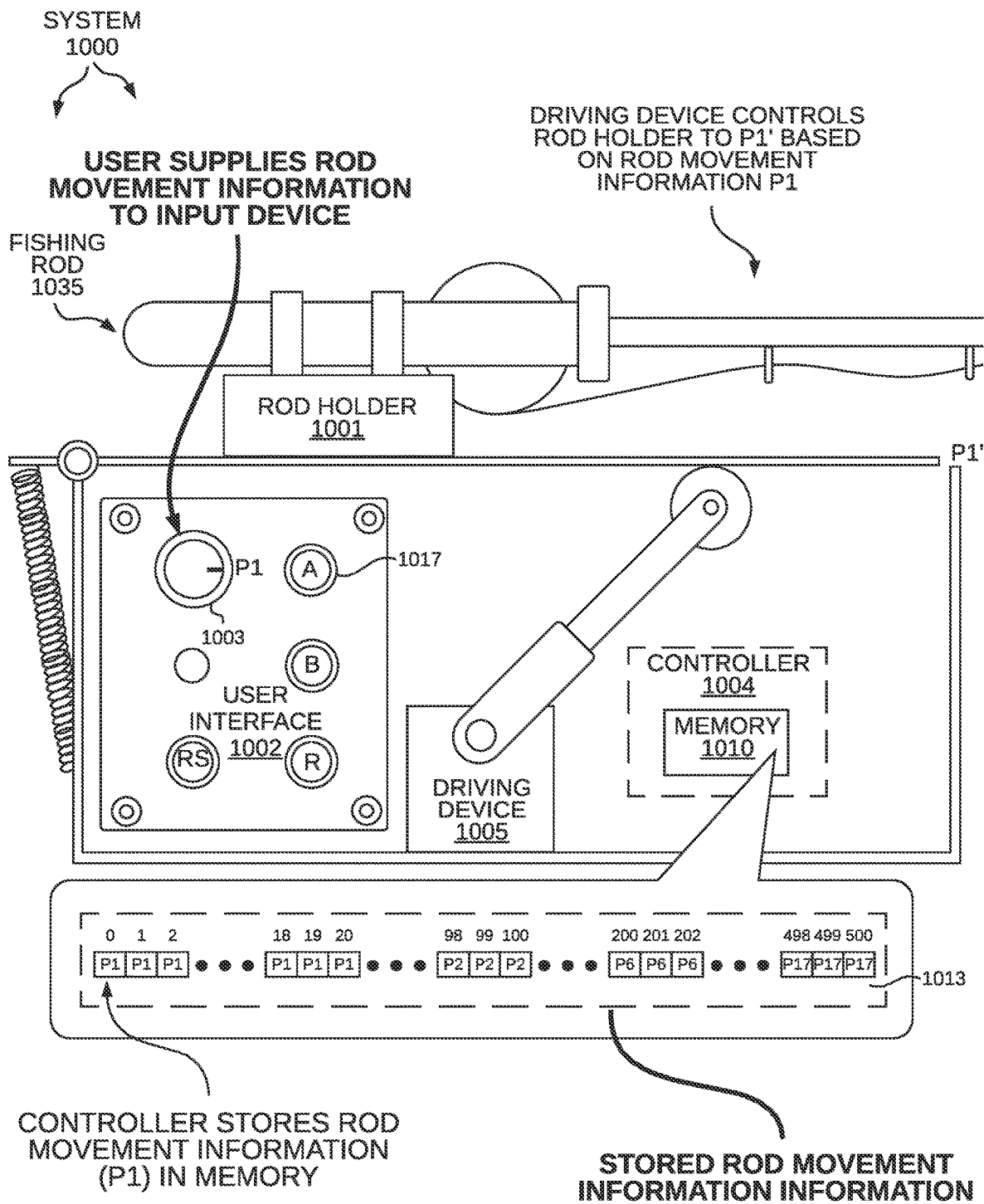
FIG. 17 is a diagram showing how rod movement information P1 is received onto input device 1002 and stored in memory 1010.

FIG. 17 is a diagram showing how rod movement information P1 is received onto input device 1003 and stored in memory 1010. This is also referred to as recording of a jigging sequence, During recording of a jigging sequence, the controller 1004 controls the driving device 1005 to move rod holder 1001 to position P1' synchronously with the input device 1003. The rod holder 1001 retains a fishing rod 1035. The fishing rod 1035 is controlled to jig up and down via the potentiometer 1003. The jigging sequence is recorded in memory to be replayed by system 1000, In this example, the input device 1003 is a potentiometer that is rotated to position P1 by a user and the recorded jigging sequence is associated with input A 1017, In other embodiments, the controller 1004 does not control the driving device 1005 to move rod holder 1001 synchronously with the input device 1003 during recording of a jigging sequence.

The controller 1004 stores rod movement information at a sampling frequency over a sampling period. The sampling period corresponds to a length of time a jigging sequence is to be recorded for future playback. In this example, controller 1004 stores rod movement information at a sampling frequency of $\frac{1}{50}$ microseconds over a sampling period of twenty seconds. The user may choose to store a jigging sequence that extends for less than twenty seconds. In other embodiments, the sampling frequency and sampling period are configurable.

Figure 18:
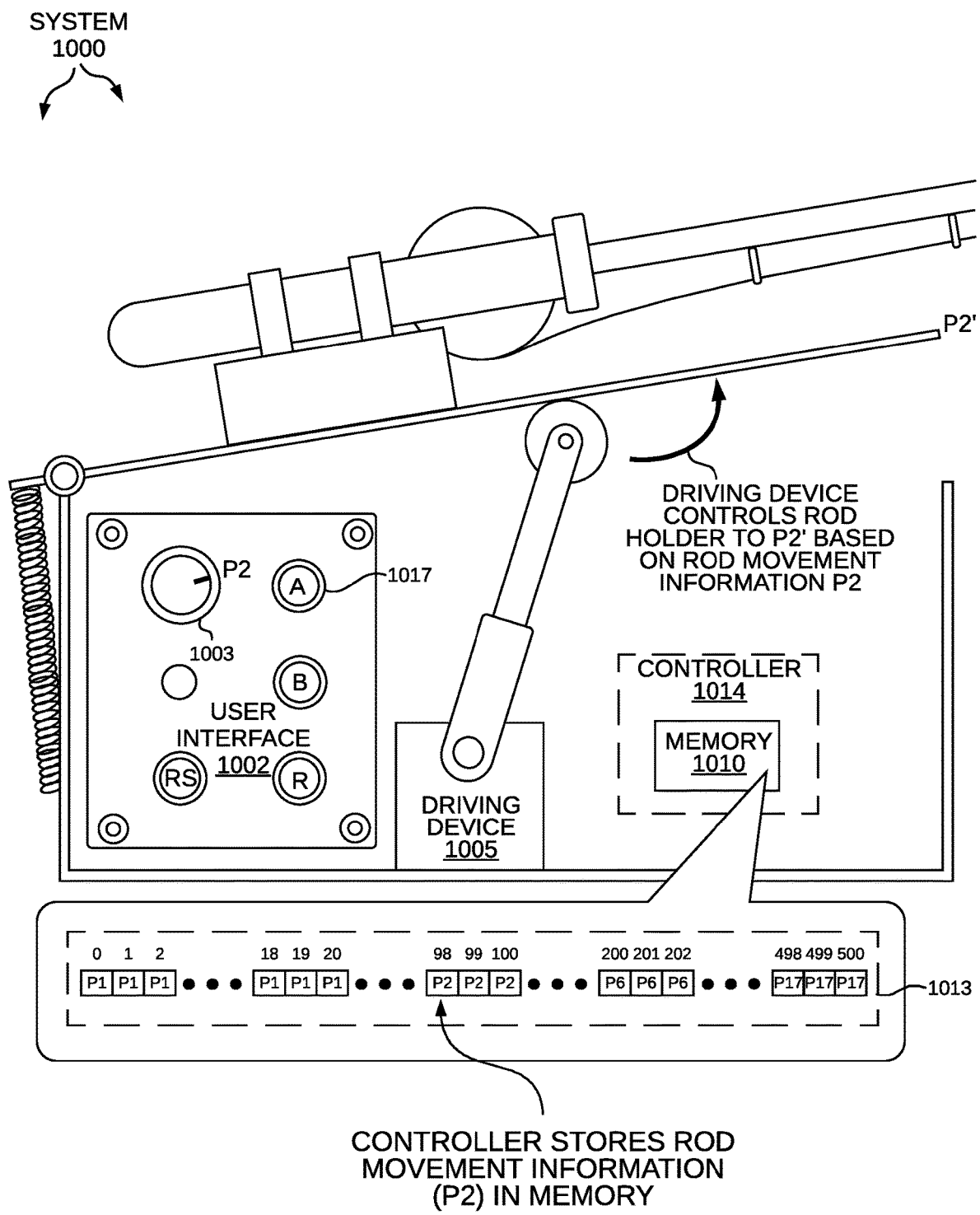
FIG. 18 is a diagram showing how rod movement information P2 is received onto input device 1002 and stored in memory 1010.

FIG. 18 is a diagram showing how rod movement information P2 is received onto input device 1003 and stored in memory 1010. Driving device 1005 drives rod holder 1001 to position P2'. The rod movement information P2 is part of a jigging sequence to be replayed by system 1000.

Figure 19:
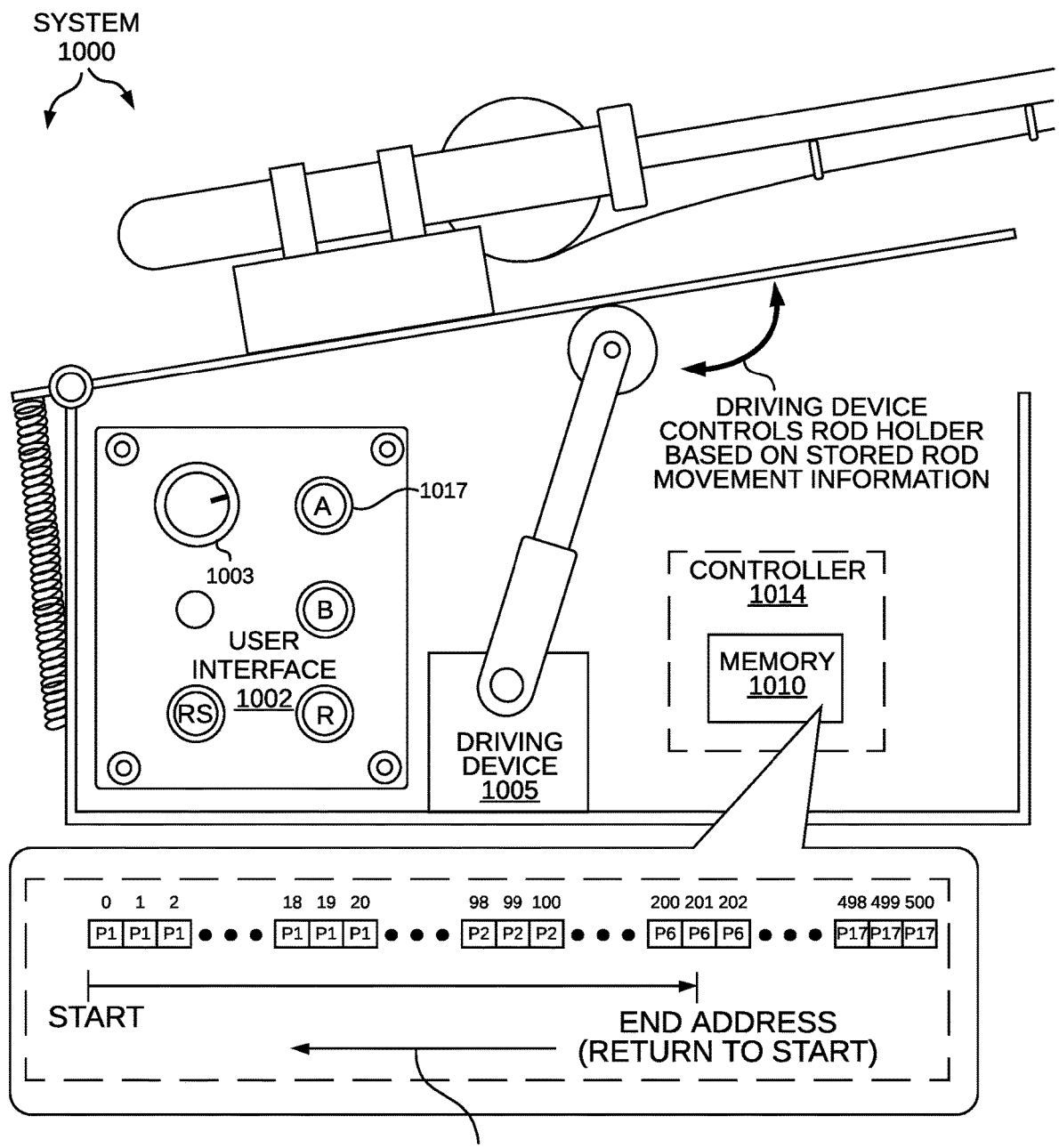
FIG. 19 is a diagram showing how the rod holder 1001 is controlled based on stored rod movement information.

FIG. 19 is a diagram showing how the rod holder 1001 is controlled based on stored rod movement information. This is also referred to as replaying a stored jigging sequence. In response to a user selecting input A 1017, the controller 1004 loops through each stored position until the stored end address is reached for the selected jigging sequence. This results in the fishing rod being controlled in accordance with the stored jigging sequence. The jigging sequence is continually repeated until user input ends the repeating loop.

Figure 20:
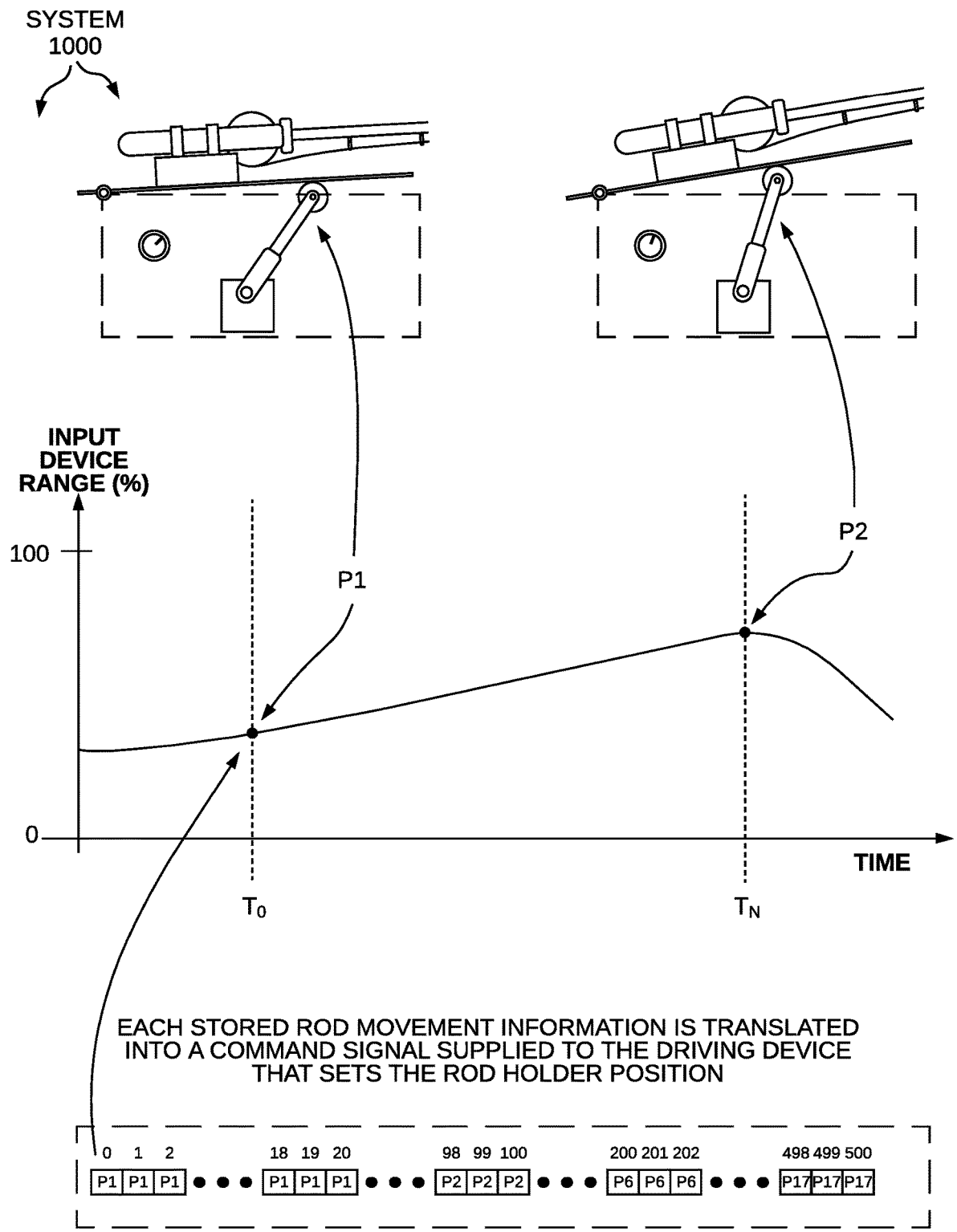
FIG. 20 is a diagram showing how each stored movement information is translated into a corresponding driving device 1005 command that moves the fishing rod 1035 and rod holder 1001 to the recorded position.

FIG. 20 is a diagram showing how each stored movement information is translated into a corresponding driving device 1005 command that moves the fishing rod 1035 and rod holder 1001 to the recorded position.

Figure 21:
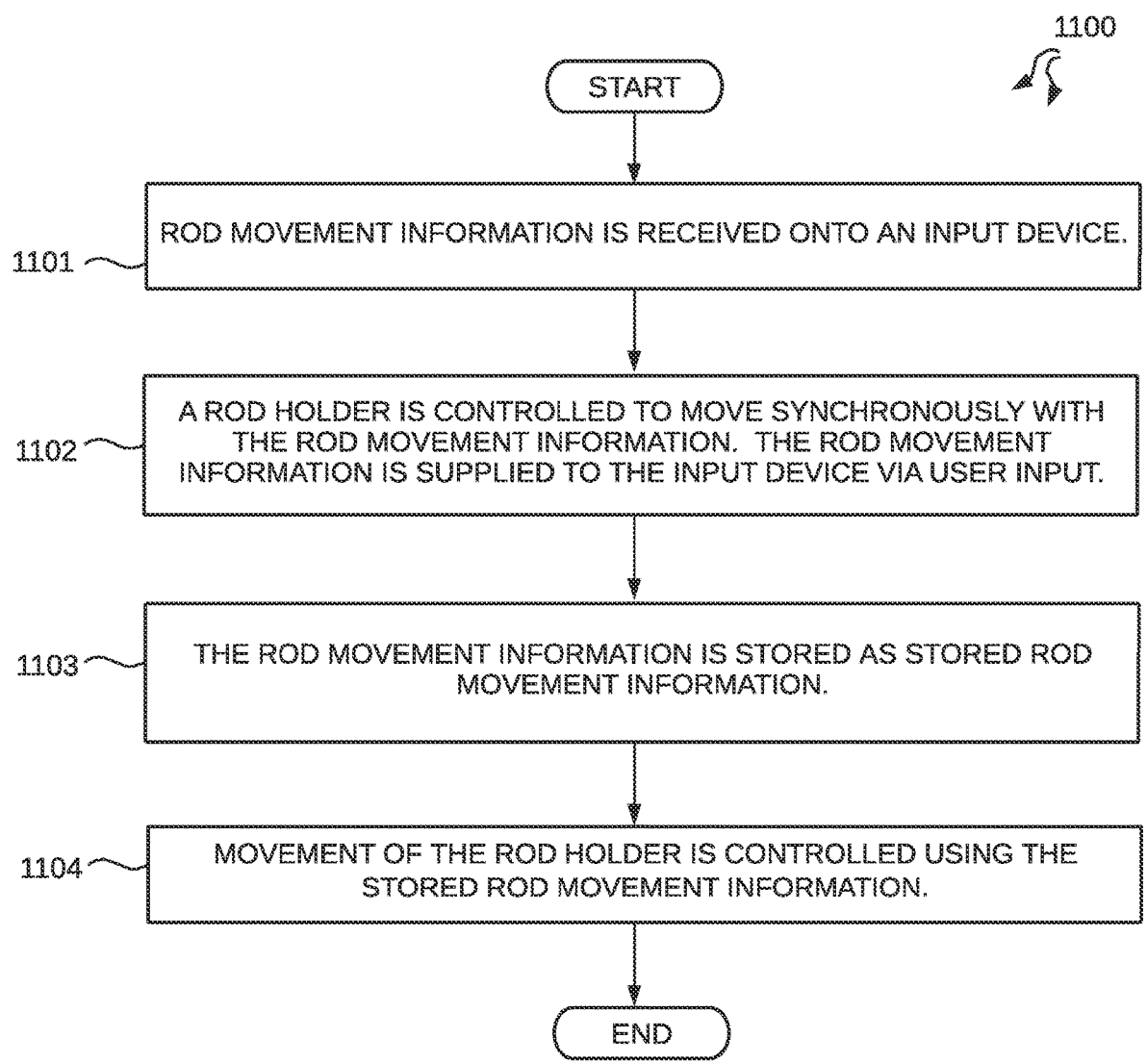
FIG. 21 is a flowchart of a method 1100 in accordance with one novel aspect.

FIG. 21 is a flowchart of a method 1100 in accordance with one novel aspect. In a first step (step 1101), rod movement information is received onto an input device. In a second step (step 1102), a rod holder is controlled to move synchronously with the rod movement information. The rod movement information is supplied to the input device via user input. In a third step (step 1103), the rod movement information is stored as stored rod movement information. In a fourth step (step 1104), movement of the rod holder is controlled using the stored rod movement information.

Figure 22:
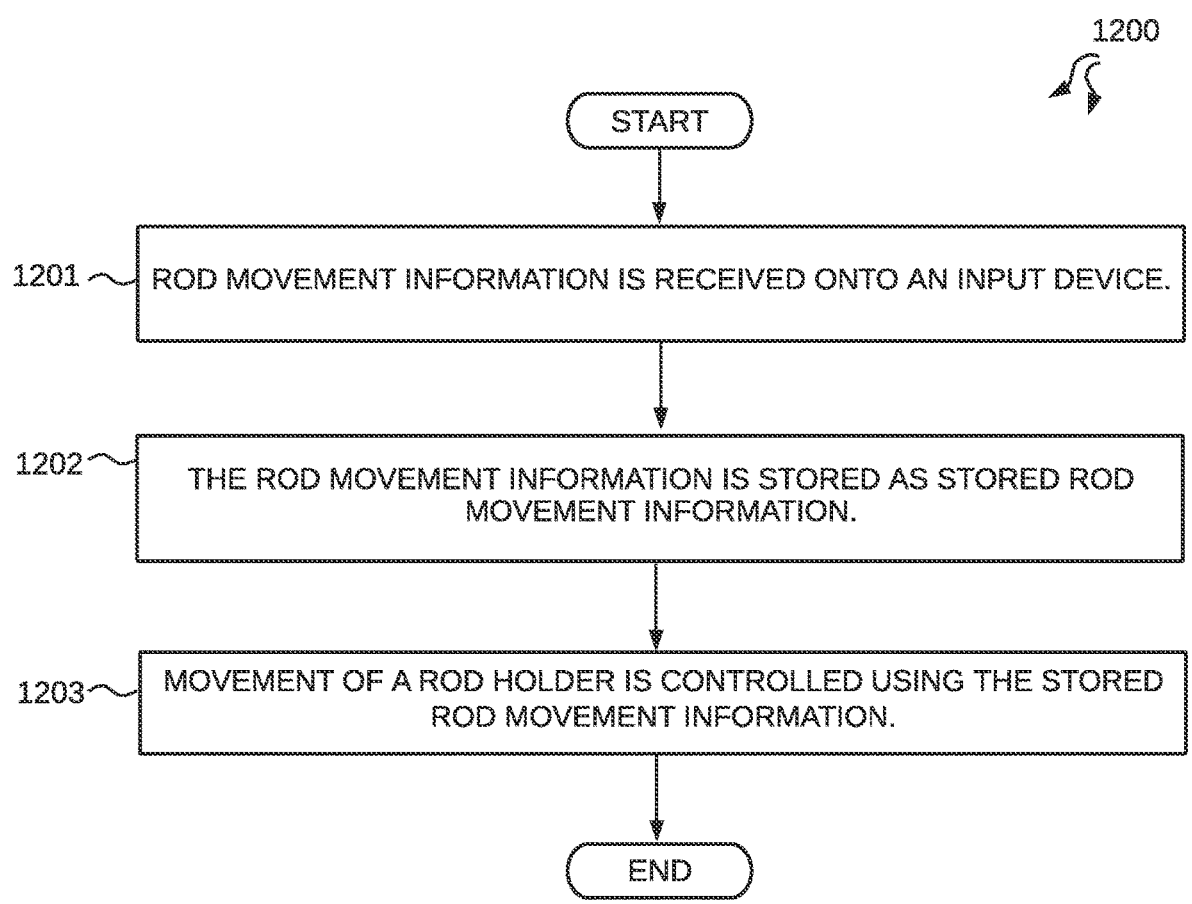
FIG. 22 is a flowchart of a method 1200 in accordance with another novel aspect.

FIG. 22 is a flowchart of a method 1200 in accordance with another novel aspect. In a first step (step 1201), rod movement information is received onto an input device. In a second step (step 1202), the rod movement information is stored as stored rod movement information. In a third step (step 1203), movement of the rod holder is controlled using the stored rod movement information.

FIG. 23 is a diagram showing another embodiment of a user interface 1300 of the system 1000. The user interface 1300 is presented on a touch display 1301. To record a new jigging sequence, a user selects the START button 1302. The user provides rod movement information by moving slider input 1303 up and down via touch display 1301. During recording of the jigging sequence, the system 1000 moves the rod holder 1001 synchronously with the slider input 1303. The user ends the jigging sequence recording by selecting the STOP button 1304.

FIG. 24 is a diagram showing another screen of a user interface 1300. Jig A is shown graphically via graph 1305. Duration of the jigging sequence is presented below graph 1305. The recorded jigging sequence can be replayed by system 1000 by selecting the REPLAY input 1306 via touch display 1301. The replay speed of the jigging sequence is controlled by selecting the SET REPLAY SPEED input 1307. The duration of time the jigging sequence is to be replayed is set via the SET REPLAY DURATION input 1308. A new jigging sequence associated with JIG A is configured via the REPROGRAM input 1309. Jigging sequence JIG A is renamed via the RENAME input 1310.

FIG. 25 is a diagram showing another screen of a user interface 1300. Jigging sequence JIG A is selected via JIG A input 1311. Jigging sequence JIG B is selected via JIG B input 1312. Jigging sequence JIG C is selected via JIG C input 1313. A random jigging sequence is selectable via RANDOM JIG input 1314. A new jig is recorded by selecting RECORD NEW JIG input 1315.

Figure 26:
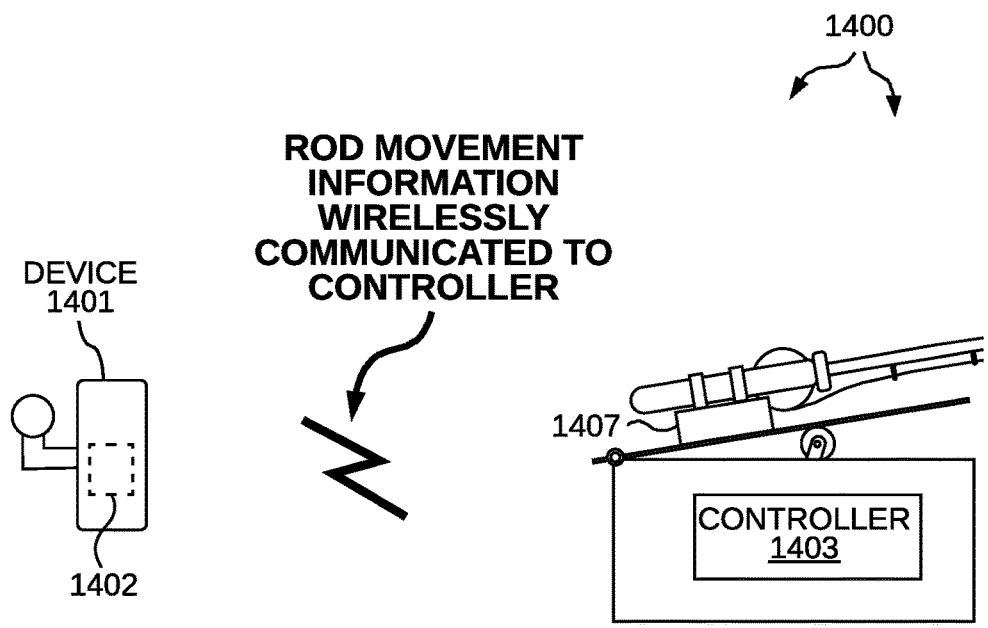
FIG. 26 is a diagram showing another embodiment of a system 1400.

FIG. 26 is a diagram showing another embodiment of a system 1400. The system 1400 operates similarly to system 1000 except that the rod movement information is received wirelessly from a user device 1401. In one example, the user device 1401 is a mobile phone that runs a mobile application 1402. The mobile application 1402 is configured to communicate wirelessly with a controller 1403. In various embodiments, the mobile application 1402 communicates the rod movement information to controller 1403 over bluetooth, wifi, cellular network, or other wireless networks.

Figure 27:
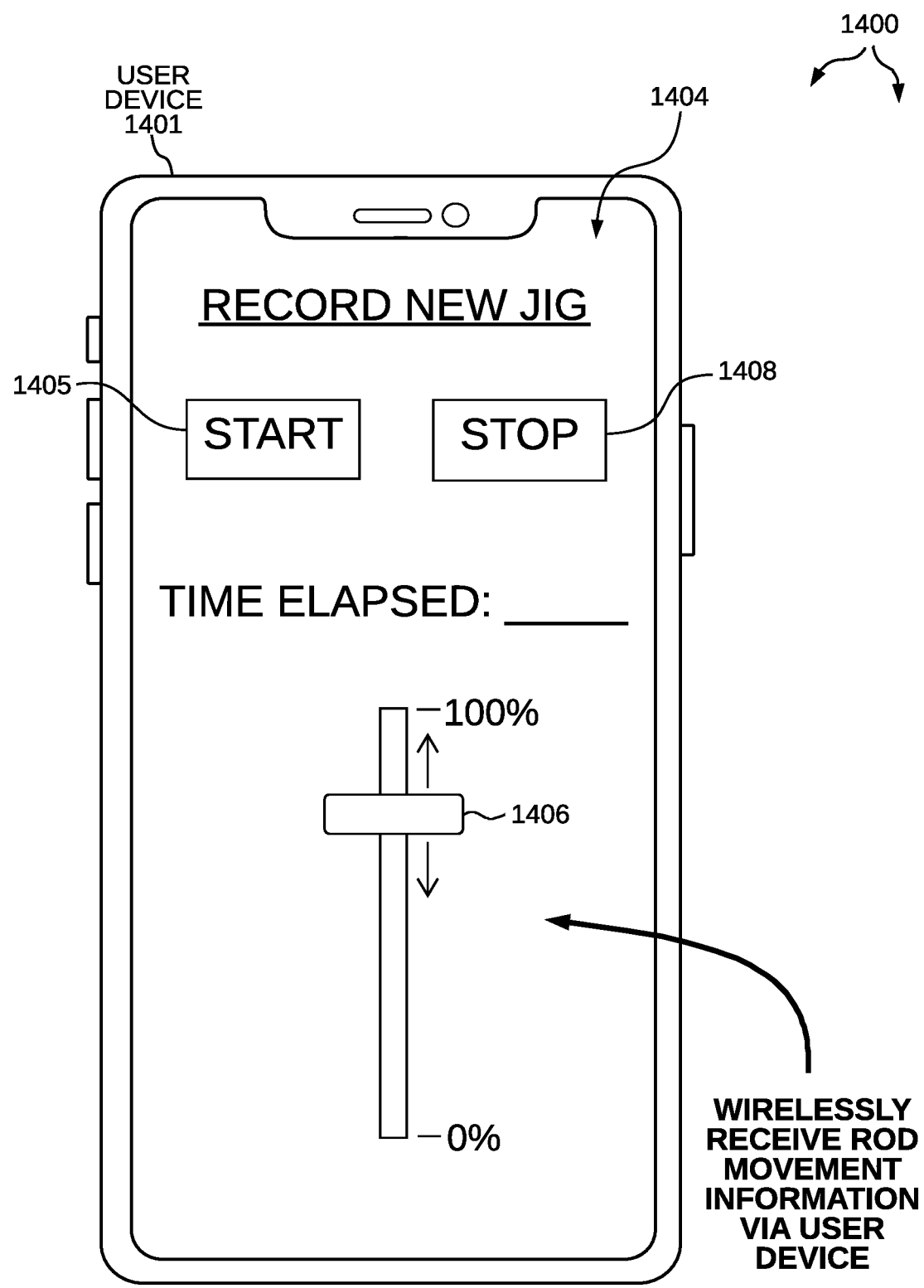
FIG. 27 is a diagram showing a user interface 1404 of the system 1400.

FIG. 27 is a diagram showing a user interface 1404 of the system 1400. The user interface 1404 is presented on a touch display of the user device 1401. To record a new jigging sequence, a user selects START input 1405. The user provides rod movement information by moving slider input 1406 up and down via user device 1401. During recording of the jigging sequence, the system 1400 moves the rod holder 1407 synchronously with the slider input 1406. The user ends the jigging sequence recording by selecting the STOP button 1408.

Figure 28:
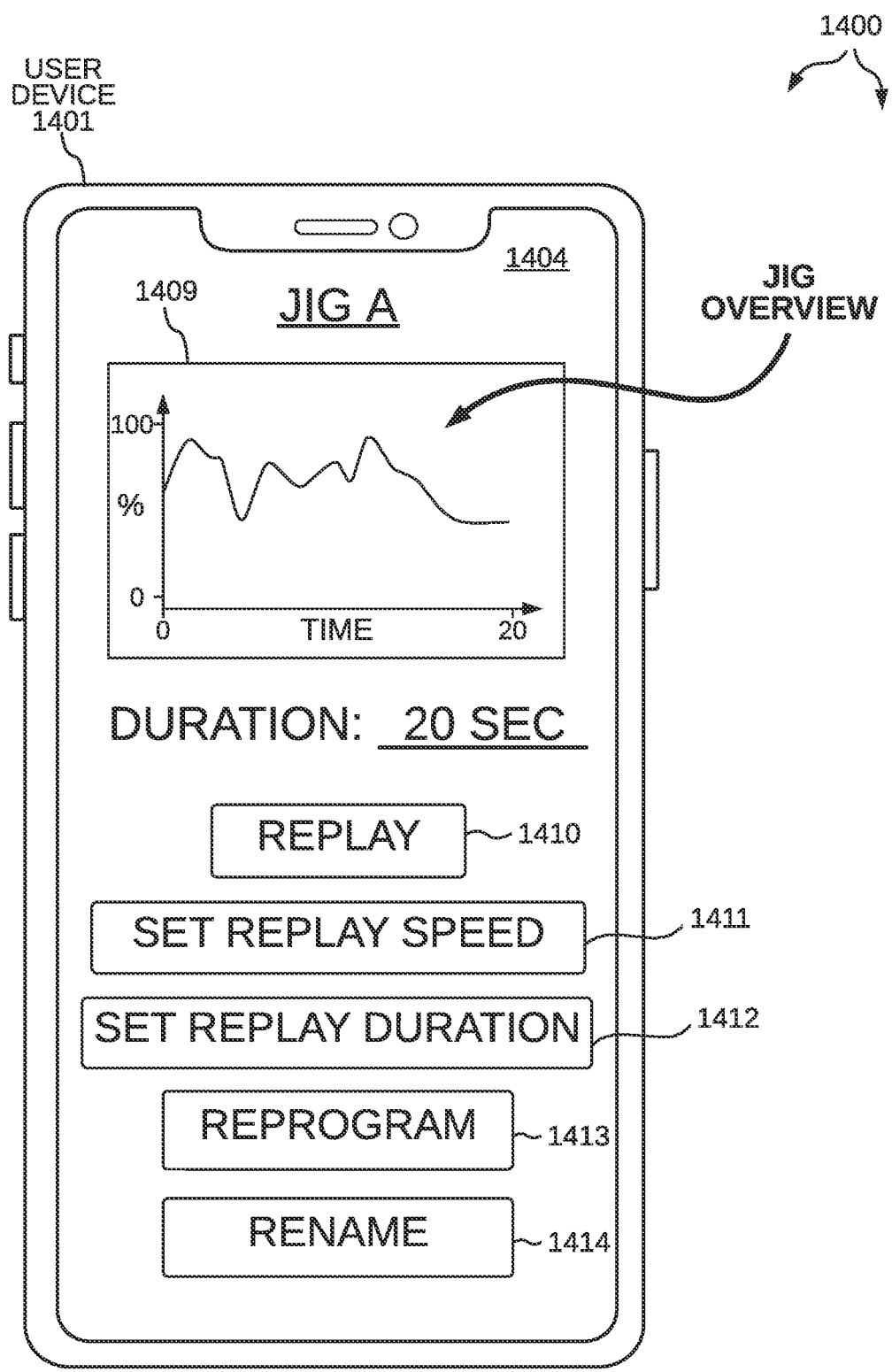
FIG. 28 is a diagram showing another screen of a user interface 1404.

FIG. 28 is a diagram showing another screen of a user interface 1404. Jig A is shown graphically via graph 1409. Duration of the jigging sequence is presented below graph 1409. The recorded jigging sequence can be replayed by system 1400 by selecting the REPLAY input 1410 via user interface 1404. The replay speed of the jigging sequence is controlled by selecting the SET REPLAY SPEED input 1411. The duration of time the jigging sequence is to be replayed is set via the SET REPLAY DURATION input 1412. A new jigging sequence associated with JIG A is configured via the REPROGRAM input 1413. Jigging sequence JIG A is renamed via the RENAME input 1414.

Figure 29:
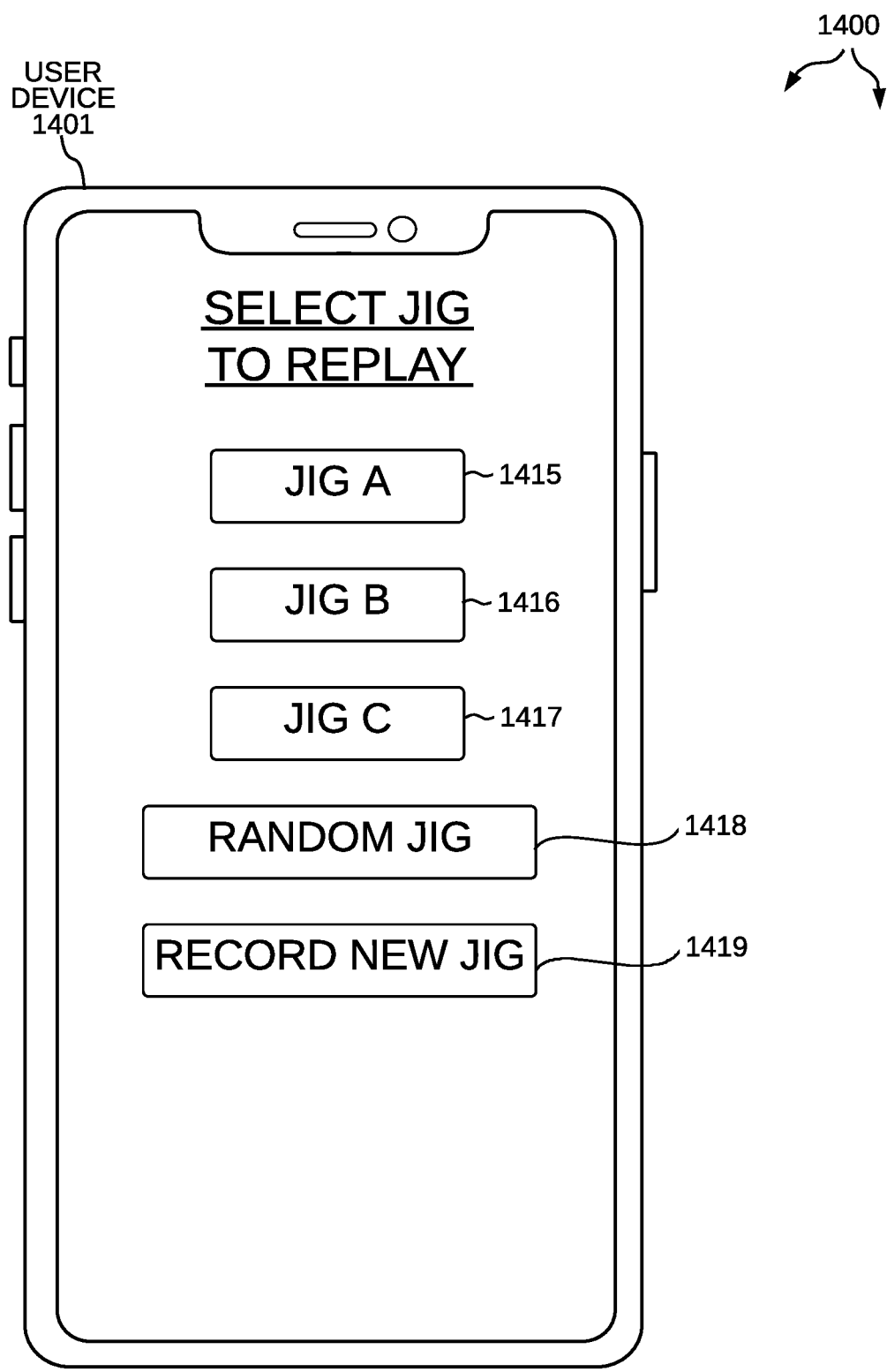
FIG. 29 is a diagram showing another screen of Hail the user interface 1404.

FIG. 29 is a diagram showing another screen of a user interface 1404. Jigging sequence JIG A is selected via JIG A input 1415. Jigging sequence JIG B is selected via JIG B input 1416. Jigging sequence JIG C is selected via JIG C input 1417. A random jigging sequence is selectable via RANDOM JIG input 1418. A new jig is recorded by selecting RECORD NEW JIG input 1419.

Figure 30:
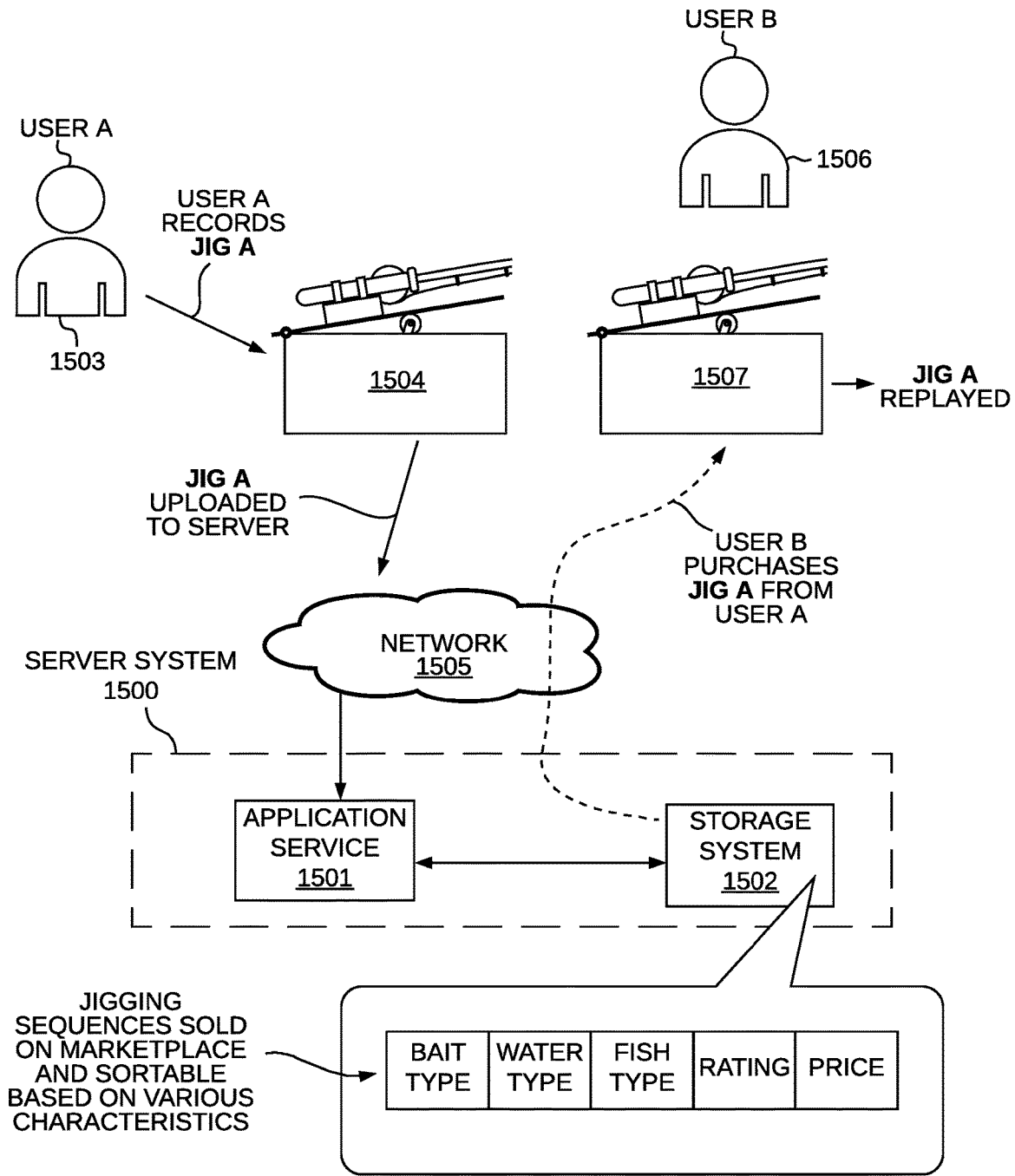
FIG. 30 is a diagram of a server system 1500.

FIG. 30 is a diagram of a server system 1500. System 1500 provides a jigging sequence marketplace where users can record jigging sequences and offer their recorded jigging sequences for sale to other users. The system 1500 includes an application service 1501 and a storage system 1502. The application service 1501 and the storage system 1502 are provided on the same server or distributed over a network. The application service 1501 stores jigging sequences based on various sortable characteristics that assist users in purchasing jigging sequences from other users. For example, jigging sequences are sortable by bait type, water type, fish type, rating, and price. Jigging sequences that are historically successful for other fishermen tend to be rated higher and sell for higher premiums.

In this example, user A 1503 records a jigging sequence JIG A on jigging system 1504. The user A 1503 uploads the jigging sequence JIG A to the application service 1501 via network 1505. Upon upload to application service 1501, user A 1503 provides information associated with JIG A, including a desired sales price. User B 1506 views available jigging sequences and decides to purchase JIG A. User A 1503 is paid and JIG A is loaded onto jigging system 1507. User B is able to replay jigging sequence JIG A on User B's jigging system 1507. The jigging systems 1504 and 1507 operate in a similar manner as jigging system 1000, except that jigging systems 1504 and 1507 are network enabled and communicate with server system 1500 over network 1505.

Although certain specific embodiments are described above for instructional purposes, the teachings of this patent document have general applicability and are not limited to the specific embodiments described above. The function of the circuitry illustrated in the figures can be implemented in hardware circuitry, or in a combination of dedicated hardware circuitry and software, or largely in software. Accordingly, various modifications, adaptations, and combinations of various features of the described embodiments can be practiced without departing from the scope of the invention as set forth in the claims.

What is claimed is:

1. A system comprising:
a rod holder;
an input device, wherein the input device receives rod movement information; and
a controller, wherein the controller is operable in a first state and a second state, wherein in the first state, the controller stores the rod movement information and synchronously moves the rod holder hi accordance with the rod movement information, and wherein in the second state, the controller moves the rod holder in accordance with rod movement information stored in the first state.

2. The system of claim 1 wherein the rod holder retains one or more fishing rods, wherein the rod movement information is supplied to the input device via user input, and wherein the rod movement information indicates at least one characteristic of rod movement taken from the group consisting of: position, timing, direction, angle, and speed.

3. The system of claim 1, further comprising:
a driving device, wherein the driving device is coupled to drive the rod holder, wherein the controller translates the rod movement information into a command signal that controls the driving device, and wherein the driving device comprises at least one element selected from the group consisting of: a linear servo, a rotary servo, an actuator, a step motor, a mechanical mover, and a motor.

4. The system of claim 1, wherein the input device includes at least one item selected from the group consisting of: a potentiometer, a control pad, directional keys, a joystick, a wheel, a touch display, a motion sensor, an eye movement sensor, a head tracking sensor, and a brainwave sensor, and wherein the input device communicates the rod movement information to the controller via a wired connection or via a wireless connection.

5. The system of claim 1, wherein the controller is configurable via user input to control the rod holder based on the stored rod movement information or based on a random generated sequence.

6. The system of claim 1, further comprising:
a housing, wherein the rod holder is movably attached to the housing.

7. The system of claim 6, further comprising:
at least one spring that is coupled to engage the rod holder such that less force is required to move the rod holder.

8. The system of claim 6, further comprising:
a fish bite detector, wherein the fish bite detector has a sensitivity setting that is adjustable, and wherein the fish bite detector communicates with the controller to initiate fish retrieval actions.

9. The system of claim 1, wherein the input device is part of a user interface, wherein other inputs on the user interface control whether the controller is storing rod movement information or whether the controller is controlling the rod holder based on stored rod movement information.

10. A method comprising:
receiving rod movement information onto an input device;
storing the rod movement information as stored rod movement information; and
operating a controller in a recording state and a replay state, wherein in the recording state, the controller stores the rod movement information and synchronously moves the rod holder in accordance with the rod movement information, and wherein in the replay state, the controller moves the rod holder in accordance with rod movement information stored in the recording state.

11. The method of claim 10, wherein the rod movement information indicates at least one characteristic of rod holder movement taken from the group consisting of: position, timing, direction, angle, and speed.

12. The method of claim 10, wherein a driving device is coupled to drive the rod holder, and wherein the controller translates the rod movement information into a command signal that controls the driving device.

13. The method of claim 12, wherein the driving device includes at least one item selected from the group consisting of: a linear servo, a rotary servo, an actuator, a step motor, a mechanical mover, and a motor.

14. The method of claim 10, wherein the input device includes at least one item selected from the group consisting of: a potentiometer, a control pad, directional keys, a joystick, a wheel, a touch display, a motion sensor, an eye movement sensor, a head tracking sensor, and a brainwave sensor.

15. The method of claim 10, wherein the input device wirelessly communicates the rod movement information to the controller.

16. A system comprising:
a rod holder; and
means for operating the rod holder in a recording state and a replay state, wherein in the recording state, the means stores the rod movement information and synchronously moves the rod holder in accordance with the rod movement information, and wherein in the replay state, the means moves the rod holder hi accordance with rod movement information stored in the recording state.

17. The system of claim 16, wherein the means is a controller, and wherein the rod movement information is received onto an input device.

18. The system of claim 1, wherein the controller is operable in a third state, wherein the third state is a free state.

19. The system of claim 1, wherein the first state is a recording state.

20. The system of claim 1, wherein the second state is a replay state.

* * * * *